(12) United States Patent
Bradski

(10) Patent No.: US 11,216,965 B2
(45) Date of Patent: *Jan. 4, 2022

(54) DEVICES, METHODS AND SYSTEMS FOR BIOMETRIC USER RECOGNITION UTILIZING NEURAL NETWORKS

(71) Applicant: MAGIC LEAP, INC., Plantation, FL (US)

(72) Inventor: Gary R. Bradski, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/804,608

(22) Filed: Feb. 28, 2020

(65) Prior Publication Data
US 2020/0202547 A1 Jun. 25, 2020

Related U.S. Application Data

(63) Continuation of application No. 16/351,912, filed on Mar. 13, 2019, now Pat. No. 10,636,159, which is a
(Continued)

(51) Int. Cl.
*G06T 7/62* (2017.01)
*G06K 9/00* (2006.01)
*G06K 9/46* (2006.01)

(52) U.S. Cl.
CPC .............. *G06T 7/62* (2017.01); *G06K 9/00597* (2013.01); *G06K 9/00617* (2013.01); *G06K 9/4628* (2013.01); *G06K 2009/00939* (2013.01)

(58) Field of Classification Search
CPC .. G06T 7/62; G06K 9/00597; G06K 9/00617; G06K 9/4628; G06K 2009/00939
See application file for complete search history.

(56) References Cited

U.S. PATENT DOCUMENTS

| 5,111,516 A | 5/1992 | Nakano et al. |
| 5,291,560 A | 3/1994 | Daugman |

(Continued)

FOREIGN PATENT DOCUMENTS

| AU | 2016261487 | 5/2016 |
| EP | 1650711 | 4/2006 |

(Continued)

OTHER PUBLICATIONS

Demjen, E., et al., "Eye Tracking Using Artificial Neural Networks for Human Computer Interaction," Institute of Experimental Physics, Slovakia, dated Aug. 1, 2011 (4 pages).
(Continued)

*Primary Examiner* — Manav Seth
(74) *Attorney, Agent, or Firm* — Vista IP Law Group, LLP

(57) ABSTRACT

A user identification system includes an image recognition network to analyze image data and generate shape data based on the image data. The system also includes a generalist network to analyze the shape data and generate general category data based on the shape data. The system further includes a specialist network to compare the general category data with a characteristic to generate narrow category data. Moreover, the system includes a classifier layer including a plurality of nodes to represent a classification decision based on the narrow category data.

19 Claims, 14 Drawing Sheets

Related U.S. Application Data continuation of application No. 15/150,042, filed on May 9, 2016, now Pat. No. 10,275,902.

(60) Provisional application No. 62/159,593, filed on May 11, 2015.

(56) References Cited

U.S. PATENT DOCUMENTS

| | | | |
|---|---|---|---|
| 5,511,134 A | 4/1996 | Kuratomi et al. | |
| 5,572,596 A | 11/1996 | Wildes et al. | |
| 5,751,286 A | 5/1998 | Barber et al. | |
| 5,850,470 A | 12/1998 | Kung et al. | |
| 6,018,728 A | 1/2000 | Spence et al. | |
| 6,035,057 A | 3/2000 | Hoffman | |
| 6,121,953 A | 9/2000 | Walker | |
| 6,138,109 A | 10/2000 | Grichnik et al. | |
| 6,768,509 B1 | 7/2004 | Bradski et al. | |
| 6,865,302 B2 | 3/2005 | Chang | |
| 7,016,532 B2 | 3/2006 | Boncyk et al. | |
| 7,324,669 B2 | 1/2008 | Nakanishi et al. | |
| 7,379,563 B2 | 5/2008 | Shamaie | |
| 7,603,000 B2 | 10/2009 | Zheng et al. | |
| 7,644,049 B2 | 1/2010 | Bradski | |
| 7,689,008 B2 | 3/2010 | Hammoud et al. | |
| 7,758,185 B2 | 7/2010 | Lewis | |
| 8,031,948 B2 | 10/2011 | Liu et al. | |
| 8,131,011 B2 | 3/2012 | Nevatia et al. | |
| 8,180,112 B2 | 5/2012 | Kurtz et al. | |
| 8,235,529 B1 | 8/2012 | Raffle et al. | |
| 8,353,594 B2 | 1/2013 | Lewis | |
| 8,369,595 B1 | 2/2013 | Derakhshani et al. | |
| 8,374,404 B2 | 2/2013 | Williams et al. | |
| 8,392,484 B2 | 3/2013 | Zhou et al. | |
| 8,411,910 B2 | 4/2013 | Savvides et al. | |
| 8,472,120 B2 | 6/2013 | Border et al. | |
| 8,488,888 B2 | 7/2013 | Balan et al. | |
| 8,553,989 B1 | 10/2013 | Owechko et al. | |
| 8,696,113 B2 | 4/2014 | Lewis | |
| 8,733,927 B1 | 5/2014 | Lewis | |
| 8,733,928 B1 | 5/2014 | Lewis | |
| 8,767,016 B2 | 7/2014 | Yang | |
| 8,873,812 B2 | 10/2014 | Larlus-Larrondo et al. | |
| 8,890,813 B2 | 11/2014 | Minnen | |
| 8,953,851 B2 | 2/2015 | Inkumsah et al. | |
| 8,963,806 B1 | 2/2015 | Starner et al. | |
| 8,965,822 B2 | 2/2015 | Frank et al. | |
| 8,985,442 B1 | 3/2015 | Zhou | |
| 9,010,929 B2 | 4/2015 | Lewis | |
| 9,041,622 B2 * | 5/2015 | McCulloch | G06F 3/013 345/7 |
| 9,147,125 B2 | 9/2015 | Wang et al. | |
| 9,224,068 B1 | 12/2015 | Ranzato | |
| 9,235,064 B2 | 1/2016 | Lewis | |
| 9,239,473 B2 | 1/2016 | Lewis | |
| 9,244,293 B2 | 1/2016 | Lewis | |
| 9,317,785 B1 | 4/2016 | Moon et al. | |
| 9,501,498 B2 | 11/2016 | Wnuk et al. | |
| 9,530,047 B1 * | 12/2016 | Tang | G06K 9/4652 |
| 9,542,626 B2 | 1/2017 | Martinson et al. | |
| 9,600,069 B2 | 3/2017 | Publicover et al. | |
| 9,658,473 B2 | 5/2017 | Lewis | |
| 9,674,707 B2 | 6/2017 | Boettcher et al. | |
| 9,721,150 B2 | 8/2017 | Gottemukkula et al. | |
| 9,730,643 B2 * | 8/2017 | Georgescu | G16H 50/30 |
| 9,767,615 B2 | 9/2017 | Young et al. | |
| 9,791,700 B2 | 10/2017 | Schowengerdt | |
| 9,811,730 B2 | 11/2017 | Komogortsev | |
| 9,911,219 B2 | 3/2018 | Fleishman et al. | |
| 10,151,937 B2 | 12/2018 | Lewis | |
| 10,185,147 B2 | 1/2019 | Lewis | |
| 10,255,529 B2 | 4/2019 | Rabinovich et al. | |
| 10,275,902 B2 * | 4/2019 | Bradski | G06K 9/00597 |
| 10,636,159 B2 * | 4/2020 | Bradski | G06T 7/62 |
| 2002/0102024 A1 | 8/2002 | Jones et al. | |
| 2002/0159627 A1 | 10/2002 | Schneiderman et al. | |
| 2006/0008151 A1 * | 1/2006 | Lin | G06K 9/6292 382/190 |
| 2006/0239670 A1 | 10/2006 | Cleveland | |
| 2006/0291697 A1 | 12/2006 | Luo | |
| 2007/0022329 A1 | 1/2007 | Adamek et al. | |
| 2007/0036397 A1 | 2/2007 | Hamza | |
| 2007/0182812 A1 | 8/2007 | Ritchey | |
| 2008/0187227 A1 | 8/2008 | Bober et al. | |
| 2009/0140839 A1 | 6/2009 | Bishop et al. | |
| 2009/0185723 A1 | 7/2009 | Kurtz et al. | |
| 2010/0002913 A1 | 1/2010 | Hamza | |
| 2010/0014718 A1 | 1/2010 | Savvides et al. | |
| 2010/0177929 A1 | 7/2010 | Kurtz et al. | |
| 2010/0201621 A1 | 8/2010 | Niikawa | |
| 2011/0194738 A1 | 8/2011 | Choi et al. | |
| 2011/0286628 A1 | 11/2011 | Goncalves | |
| 2011/0317917 A1 | 12/2011 | Free | |
| 2012/0069294 A1 | 3/2012 | Ohno et al. | |
| 2012/0121193 A1 | 5/2012 | Lipson et al. | |
| 2012/0212399 A1 | 8/2012 | Border et al. | |
| 2012/0233072 A1 | 9/2012 | Caiman et al. | |
| 2013/0030966 A1 | 1/2013 | Aidasani et al. | |
| 2013/0044055 A1 | 2/2013 | Karmarkar et al. | |
| 2013/0054622 A1 | 2/2013 | Karmarkar et al. | |
| 2013/0076943 A1 | 3/2013 | Yoon et al. | |
| 2013/0267204 A1 | 10/2013 | Schultz et al. | |
| 2013/0336547 A1 | 12/2013 | Komogortsev | |
| 2013/0346168 A1 | 12/2013 | Zhou et al. | |
| 2014/0037152 A1 | 2/2014 | Tan et al. | |
| 2014/0055488 A1 | 2/2014 | Masters et al. | |
| 2014/0055591 A1 | 2/2014 | Katz | |
| 2014/0126782 A1 | 5/2014 | Takai et al. | |
| 2014/0171756 A1 | 6/2014 | Waldorf et al. | |
| 2014/0270361 A1 | 9/2014 | Amma | |
| 2014/0310531 A1 | 10/2014 | Kundu et al. | |
| 2014/0337634 A1 | 11/2014 | Starner et al. | |
| 2015/0009124 A1 | 1/2015 | Antoniac | |
| 2015/0012426 A1 | 1/2015 | Purves | |
| 2015/0016712 A1 | 1/2015 | Rhoads et al. | |
| 2015/0036922 A1 | 2/2015 | El Dokor | |
| 2015/0051840 A1 | 2/2015 | Vervier et al. | |
| 2015/0073907 A1 | 3/2015 | Purves et al. | |
| 2015/0112684 A1 | 4/2015 | Scheffer et al. | |
| 2015/0117760 A1 | 4/2015 | Wang et al. | |
| 2015/0126845 A1 | 5/2015 | Jin et al. | |
| 2015/0139535 A1 | 5/2015 | Siddiqui | |
| 2015/0186708 A1 | 7/2015 | Katz | |
| 2015/0199006 A1 | 7/2015 | He et al. | |
| 2015/0205126 A1 | 7/2015 | Schowengerdt | |
| 2015/0261803 A1 * | 9/2015 | Song | G06K 9/4671 707/797 |
| 2015/0278642 A1 | 10/2015 | Chertok et al. | |
| 2015/0294303 A1 | 10/2015 | Hanson et al. | |
| 2015/0296135 A1 | 10/2015 | Wacquant et al. | |
| 2015/0301797 A1 | 10/2015 | Miller | |
| 2015/0302027 A1 | 10/2015 | Wnuk et al. | |
| 2015/0324998 A1 | 11/2015 | Song et al. | |
| 2015/0332513 A1 | 11/2015 | Scavezze et al. | |
| 2015/0338915 A1 | 11/2015 | Publicover et al. | |
| 2015/0346495 A1 | 12/2015 | Welch et al. | |
| 2016/0070121 A1 | 3/2016 | Sales | |
| 2016/0104058 A1 | 4/2016 | He et al. | |
| 2016/0140383 A1 | 5/2016 | Kim et al. | |
| 2016/0189413 A1 | 6/2016 | Houjou et al. | |
| 2016/0209657 A1 | 7/2016 | Popovich et al. | |
| 2016/0335512 A1 | 11/2016 | Bradski | |
| 2016/0358181 A1 | 12/2016 | Bradski | |
| 2017/0093846 A1 | 3/2017 | Lopez Lecube et al. | |
| 2017/0261750 A1 | 9/2017 | Wong et al. | |
| 2017/0262737 A1 | 9/2017 | Rabinovich | |
| 2018/0018451 A1 | 1/2018 | Spizhevoy et al. | |
| 2018/0018553 A1 | 1/2018 | Bach et al. | |
| 2018/0024726 A1 | 1/2018 | Hviding | |
| 2018/0129870 A1 | 5/2018 | Bacivarov et al. | |
| 2018/0137335 A1 | 5/2018 | Kim et al. | |
| 2019/0213751 A1 | 7/2019 | Bradski | |
| 2019/0286951 A1 | 9/2019 | Rabinovich et al. | |

(56) References Cited

U.S. PATENT DOCUMENTS

FOREIGN PATENT DOCUMENTS

| | | |
|---|---|---|
| JP | 2003-533801 | 11/2003 |
| JP | 2012-008746 | 1/2012 |
| JP | 2013-521576 | 6/2013 |
| JP | 2013-250856 | 12/2013 |
| WO | WO 2005022343 | 3/2005 |
| WO | WO 14/158345 | 10/2014 |
| WO | WO 2016/183020 | 11/2016 |

OTHER PUBLICATIONS

PCT International Search Report and Written Opinion for International Appln. No. PCT/US2016/031499, Applicant Magic Leap, Inc., Forms PCT/ISA/210, 220, and 237, dated Aug. 5, 2016 (14 pages).
PCT International Search Report and Written Opinion for International Appln. No. PCT/US17/22206, Applicant Magic Leap, Inc., forms PCT/ISA/210, 220, and 237, dated May 25, 2017 (8 pages).
Feng, J., et al., "Learning the structure of deep convolutional networks," Department of EECS and ICSI, UC Berkeley, dated 2015 (9 pages).
Response to Non-final office action filed May 21, 2018 for U.S. Appl. No. 15/457,990.
Extended European Search Report for EP Appln. No. 16793329.0, dated May 29, 2018.
Final Office Action for U.S. Appl. No. 15/457,990, dated Jun. 25, 2018.
Non-Final Office Action for U.S. Appl. No. 15/150,042, dated Sep. 12, 2018.
RCE and Response to Final Office Action filed Sep. 25, 2018 for U.S. Appl. No. 15/457,990.
Response to Office Action filed Dec. 12, 2018 for U.S. Appl. No. 15/150,042.
Notice of Allowance dated Nov. 29, 2018 for U.S. Appl. No. 15/457,990.
Response to European Search Report filed Dec. 24, 2018 for EP Appln. No. 16793329.0.
Notice of Allowance dated Jan. 18, 2019 for U.S. Appl. No. 15/150,492.
Extended European Search Report for EP Appln. No. 17764297.2, dated Feb. 26, 2019.
Non-Final Office Action dated Apr. 18, 2019 for U.S. Appl. No. 16/351,912.
Office Action dated Jun. 23, 2019, for Israeli Patent Appln. No. 255234, with English translation, 18 pages.
Response to Office Action filed Aug. 15, 2019 for U.S. Appl. No. 16/351,912.
Response to Extended European Search Report for EP Appln. No. 17764297.2, filed Sep. 17, 2019.
Final Office Action dated Nov. 15, 2019 for U.S. Appl. No. 16/351,912.
Response to Final Office Action dated Nov. 15, 2019 for U.S. Appl. No. 16/351,912.
Examination Report for Australian Appln. No. 2016261487, dated Nov. 28, 2019 (4 pages).
Examination Report for New Zealand Appln. No. 736574, dated Jan. 31, 2020 (3 pages).
Response to Examination Report for Australian Appln. No. 2016261487, filed Feb. 5, 2020 (14 pages).
Foreign Office Action for IL Patent Appln. No. 261245 dated May 4, 2020.
Foreign Notice of Acceptance for IL Patent Appln. No. 255234 dated Jul. 2, 2020.
Foreign Office Action for JP Patent Appln. No. 2017-558715 dated Jul. 2, 2020.
3rd Exam Report for AU Patent Appln. No. 2016261487 dated Jul. 1, 2020.
Response to 2nd Exam for AU Patent Appln. No. 2016261487 dated Jun. 9, 2020.
Foreign Office Action for KR Patent Appln. No. 10-2018-7029132 dated Jul. 23, 2020.
Foreign Response to Examiner's Report for NZ Patent Appln. No. 736574 dated Jul. 28, 2020.
Foreign Office Action for JP Patent Appln. No. 2018-547429 dated Jul. 21, 2020.
2nd Examination Report for NZ Patent Appln. No. 736574 dated Aug. 24, 2020.
3rd Examination Report for AU Patent Appln. No. 2016261487 dated Aug. 26, 2020.
Foreign OA Response for IP Patent Appln. No. 261245 dated Sep. 6, 2020.
Foreign Examination Report for AU Patent Appln. No. 2016261487 dated Sep. 16, 2020.
Foreign Notice of Acceptance for IL Patent Appln. No. 261245 dated Sep. 15, 2020.
Foreign Response for KR Patent Appln. No. 10-2018-7029132 dated Sep. 23, 2020.
Foreign Response for JP Patent Appln. No. 2017-558715 dated Sep. 25, 2020.
Foreign 4th Examiner's Response for AU Patent Appln. No. 2016261487 dated Sep. 28, 2020.
1st Examination Report for EP Patent Appln. No. 16793329.0 dated Sep. 30, 2020.
Foreign OA Response for JP Patent Appln. No. 2018-547429 dated Oct. 13, 2020.
Foreign 1st Exam Report for AU Patent Appln. No. 2017230184 dated Oct. 13, 2020.
Response to Non-Final Office Action filed Oct. 21, 2020 for U.S. Appl. No. 16/366,047.
Non-Final Office Action dated Jul. 21, 2020 for U.S. Appl. No. 16/366,047.
PCT International Search Report and Written Opinion for International Appln. No. PCT/US2016/032583 Applicant Magic Leap, Inc., dated Aug. 11, 2016.
Extended European Search Report for EP Appln. No. 16793671.5, dated Mar. 29, 2018.
Non-Final Office Action for U.S. Appl. No. 15/155,013, dated Sep. 14, 2018.
Response to Extended EP Search Report filed Oct. 24, 2018 for EP 16793671.5.
Response to Non-Final Office Action filed Dec. 14, 2018 for U.S. Appl. No. 15/155,013.
Final Office Action dated Mar. 21, 2019 for U.S. Appl. No. 15/155,013.
Abrar Omar Alkhamisi et al., "Rise of Augmented Reality: Current and Future Application Areas" dated Oct. 12, 2013.
Tobias Hollerer et al., "Introduction to Augmented Reality, A Brief History of Augmented Reality", published Jun. 13, 2016.
Naval Ophthalmic Support and Training Activity (NOSTRA), "Fitting and Dispensing Glasses" dated Dec. 2006.
RCE and Response to Final Office Action filed Sep. 18, 2019 for U.S. Appl. No. 15/155,013.
Office Action dated Oct. 28, 2019, for Israeli Patent Appln. No. 255325, with English translation, 5 pages.
Notice of Allowance dated Nov. 29, 2019 for U.S. Appl. No. 16/351,912.
Non-Final Office Action dated Jan. 23, 2020 for U.S. Appl. No. 15/155,013.
Wikipedia, 'Backpropagation', published Mar. 17, 2015, URL: https://en.wikipedia.org/w/index.php?title=Backpropagation&diff=651792604&oldid=651731974.
Amendment Response to Non-Final Office Action for U.S. Appl. No. 15/155,013 dated Apr. 23, 2020.
Foreign Office Action for JP Patent Appln. No. 2017-558979 dated Apr. 17, 2020.
Foreign Office Action Response for Japanese Patent Appln. No. 2017-558979 dated Jul. 10, 2020.
1st Examination Report for EP Patent Appln. No. 16793671.5 dated Jul. 10, 2020.

(56) References Cited

OTHER PUBLICATIONS

Foreign Office Action for JP Patent Appln. No. 2017-558979 dated Aug. 3, 2020.
RCE and Response to Final Office Action filed Oct. 7, 2020 for U.S. Appl. No. 15/155,013.
Foreign OA Response for JR Patent Application No. 2017-558979 dated Oct. 27, 2020.
Jacob, Robert J. "Eye Tracking in Advanced Interface Design", Human-Computer Interaction Lab, Naval Research Laboratory (1995).
Tanriverdi, V. et al. "Interacting With Eye Movements in Virtual Environments", Department of Electrical Engineering and Computer Science, Tufts University (2000).
Azuma, R., "Predictive Tracking for Augmented Reality", Department of Computer Science, CB #3175, Sitterson Hall, UNC-Chapel Hill, Feb. 1995.
Foreign OA Response for EP Patent Appln. No. 16793671.5 dated Nov. 6, 2020.
Foreign OA for JP Patent Appln. No. 2017-558715 dated Oct. 20, 2020.
Non-Final Office Action for U.S. Appl. No. 15/155,013 dated Nov. 13, 2020.
Foreign Exam Report for NZ Patent Appln. No. 736861 dated Jul. 30, 2020.
Foreign OA for CN Patent Application No. 201680027161.7 dated Oct. 12, 2020.
Foreign Response for NZ Patent Application No. 736574 dated Dec. 23, 2020.
Foreign Response for AU Patent Appln. No. 2016262579 dated Jan. 29, 2021.
Foreign Response for NZ Patent Appln. No. 736861 dated Jan. 29, 2021.
Foreign Response for EP Patent Appln. No. 16793329.0 dated Feb. 3, 2021.
Foreign Notice of Appeal for JP Patent Appln. No. 2017-558715 dated Nov. 15, 2021.
Response to Non-Final Office Action for U.S. Appl. No. 15/155,013, filed Feb. 16, 2021.
Foreign Response for CN Patent Appln. No. 201680027161.7 dated Feb. 22, 2021.
Foreign 2nd Exam Report for AU Patent Appln. No. 2016262579 dated Feb. 10, 2021.
Foreign NOA for JP Patent Appln. No. 2017-558979 dated Mar. 3, 2021.
Foreign NOA for IL Patent Appln. No. 255325 dated Dec. 30, 2020.
Foreign Oral Proceedings Summons for EP Patent Appln. No. 16793671.5 dated Feb. 23, 2021.
De Luca, A., et al., "Look into my Eyes! Can you guess my Password?", Media Informatics Group, University of Munich, 2009.
Foreign Exam Report for NZ Patent Appln. No. 736861 dated Feb. 26, 2021.
Foreign NOA for JP Patent Appln. No. 2017-558715 dated Apr. 1, 2021.
Final Office Action for U.S. Appl. No. 15/155,013 dated May 14, 2021.
Foreign OA for CN Patent Appln. No. 201680025287.0 dated Mar. 25, 2021.
Foreign Response for NZ Patent Appln. No. 736861 dated May 19, 2021.
Foreign Response for AU Patent Appln. No. 2016262579 dated May 11, 2021.
Foreign Response for EP Patent Appln. No. 16793671.5 dated Jun. 11, 2021.
Foreign Exam Report for CA Patent Appln. No. 2984455 dated Jun. 10, 2021.
Foreign OA for CN Patent Appln. No. 201680027161.7 dated May 31, 2021.
Foreign Exam Report for NZ Patent Appln. No. 736861 dated Jun. 15, 2021.
Foreign Notice of Acceptance Report for NZ Patent Appln. No. 736861 dated Jun. 15, 2021.
Foreign OA for IN Patent Appln. No. 201747040661 dated Feb. 18, 2021.
Foreign Response for CN Patent Appln. No. 201680025287.0 dated Jul. 30, 2021.
RCE and Response to Final Office Action for U.S. Appl. No. 15/155,013 dated Aug. 16, 2021.
Foreign Response for CN Patent Appln. No. 201680027161.7 dated Aug. 16, 2021.
Foreign OA for JP Patent Appln. No. 2018-547429 dated Nov. 4, 2020.
Foreign NOA for KR Patent Appln. No. 10-2018-7029132 dated Nov. 27, 2020.
Foreign Response for JP Patent Appln. No. 2018-547429 dated Jan. 26, 2021.
Foreign NOA for JP Patent Appln. No. 2018-547429 dated Apr. 22, 2021.
Foreign OA for CN Patent Appln. No. 201780016251.0 dated Mar. 8, 2021.
Foreing OA for JP Patent Appln. No. 2020-42897 dated Jun. 1, 2021.
Foreign Response for CN Patent Appln. No. 201780016251.0 dated Jul. 14, 2021.
Foreign Exam Report for EP Patent Appln. No. 17764297.2 dated Jun. 24, 2021.
Foreign NOA for CA Patent Appln. No. 2983749 dated Jul. 26, 2021.
Foreign Response for JP Patent Appln. No. 2020-42897 dated Aug. 24, 2021.
Foreign OA for KR Patent Appln. No. 10-2017-7035995 dated Sep. 9, 2021.
Foreign OA for KR Patent Appln. No. 10-2017-7035543 dated Sep. 11, 2021.
Foreign Notice of Acceptance for AU Patent Appln. No. 2017230184 dated Sep. 23, 2021.
Foreign Exam Report for IN Patent Appln. No. 201847036674 dated Sep. 24, 2021.
Foreign Exam Report for IN Patent Appln. No. 201747041611 dated Sep. 20, 2021.
Foreign Response for CA Patent Appln. No. 2984455 dated Oct. 6, 2021.
Foreign Decision of Rejection for CN Patent Appln. No. 201680027161.7 dated Sep. 18, 2021.
Foreign Response for KR Patent Appln. No. 10-2017-7035995 dated Nov. 3, 2021.
Foreign NOA for JP Patent Appln. No. 2020-42897 dated Oct. 26, 2021.
Foreign Response for EP Patent Appln. No. 17764297.2 dated Nov. 3, 2021.
Non-Final Office Action for U.S. Appl. No. 15/155,013 dated Oct. 25, 2021.
Identity Recognition through Human Gaze Tracking (Year: 2013).
Foreign Response for KR Patent Appln. No. 10-2017-7035543 dated Nov. 11, 2021.

* cited by examiner

DEVICES, METHODS AND SYSTEMS FOR BIOMETRIC USER RECOGNITION UTILIZING NEURAL NETWORKS

CROSS-REFERENCE TO RELATED APPLICATION(S)

This application is a continuation of U.S. patent application Ser. No. 16/351,912 filed on Mar. 13, 2019 entitled "DEVICES, METHODS AND SYSTEMS FOR BIOMETRIC USER RECOGNITION UTILIZING NEURAL NETWORKS", under attorney docket number ML-0252US-CON1, which is a continuation of U.S. patent application Ser. No. 15/150,042 filed on May 9, 2016 entitled "DEVICES, METHODS AND SYSTEMS FOR BIOMETRIC USER RECOGNITION UTILIZING NEURAL NETWORKS", under attorney docket number ML.20028.00, which claims priority to U.S. Provisional Application Ser. No. 62/159,593 filed on May 11, 2015 entitled "DEVICES, METHODS AND SYSTEMS FOR BIOMETRIC USER RECOGNITION UTILIZING NEURAL NETWORKS", under attorney docket number ML.30028.00. The contents of the aforementioned patent applications are hereby expressly and fully incorporated by reference in their entirety, as though set forth in full.

BACKGROUND

The migration of important activities, such as financial and health related activities, from the physical world into connected electronic ("virtual") spaces has the potential to improve human lives. However, this migration of important activities also provides new opportunities for malfeasance through identity and information theft.

To elaborate, traditional transaction systems (financial or otherwise) typically require users to physically carry or mentally recall some form of monetary token (e.g., cash, check, credit card, etc.) and in some cases, identification (e.g., driver's license, etc.) and authentication (e.g., signature, pin code, etc.) to partake in business transactions. Consider a user walking into a department store: to make any kind of purchase, the user typically picks up the item(s), places the item in a cart, walks over to the register, waits in line for the cashier, waits for the cashier to scan a number of items, retrieves a credit card, provides identification, signs the credit card receipt, and stores the receipt for a future return of the item(s). With traditional transactions systems, these steps, although necessary, are time-consuming and inefficient. In some cases, these steps discourage or prohibit a user from making a purchase (e.g., the user does not have the monetary token on their person or the identification card on their person, etc.) However, in the context of augmented reality ("AR") devices, these steps are redundant and unnecessary. In one or more embodiments, the AR devices may be configured to allow users whose identities have been pre-identified or pre-authenticated to seamlessly perform many types of transactions (e.g., financial) without requiring the user to perform the onerous procedures described above.

Traditional biometric user identification techniques such as the iris analysis technique described in U.S. Pat. No. 5,291,560, the contents of which are hereby expressly and fully incorporated herein by reference as though set forth in full, have limitations. Accordingly, the improved devices, methods and systems for recognizing users using biometric data described and claimed herein can facilitate important electronic transactions while mitigating the risks (e.g., security) associated with those transactions.

SUMMARY

In one embodiment directed to a user identification system, the system includes an image recognition network to analyze image data and generate shape data based on the image data. The system also includes a generalist network to analyze the shape data and generate general category data based on the shape data. The system further includes a specialist network to compare the general category data with a characteristic to generate narrow category data. Moreover, the system includes a classifier layer including a plurality of nodes to represent a classification decision based on the narrow category data.

In one or more embodiments, the system also includes a back propagation neural network including a plurality of layers. The back propagation neural network may also include error suppression and learning elevation.

In one or more embodiments, the system also includes an ASIC encoded with the image recognition network. The specialist network may include a back propagation network including a plurality of layers. The system may also include a tuning layer to modify the general category data based on user eye movements.

In another embodiment directed to a method of identifying a user of a system, the method includes analyzing image data and generating shape data based on the image data. The method also includes analyzing the shape data and generating general category data based on the shape data. The method further includes generating narrow category data by comparing the general category data with a characteristic. Moreover, the method includes generating a classification decision based on the narrow category data.

In one or more embodiments, the method also includes identifying an error in a piece of data. The method may also include suppressing the piece of data in which the error is identified. Analyzing the image data may include scanning a plurality of pixel of the image data. The image data may correspond to an eye of the user.

In one or more embodiments, the characteristic is from a known potentially confusing mismatched individual. The characteristic may be selected from the group consisting of eyebrow shape and eye shape. The method may also include generating a network of characteristics, where each respective characteristic of the network is associated with a potentially confusing mismatched individual in a database. The network of characteristics may be generated when the system is first calibrated for the user.

In one or more embodiments, the method also includes tracking the user's eye movements over time. The method may also include modifying the general category data based on the eye movements of the user before comparing the general category data with the limitation. The method may also include modifying the general category data to conform to a variance resulting from the eye movements of the user.

In still another embodiment directed to a computer program product embodied in a non-transitory computer readable medium, the computer readable medium having stored thereon a sequence of instructions which, when executed by a processor causes the processor to execute a method for identifying a user of a system, the method includes analyzing image data and generating shape data based on the image data. The method also includes analyzing the shape data and generating general category data based on the shape data. The method further includes generating narrow category data by comparing the general category data with a characteristic. Moreover, the method includes generating a classification decision based on the narrow category data.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
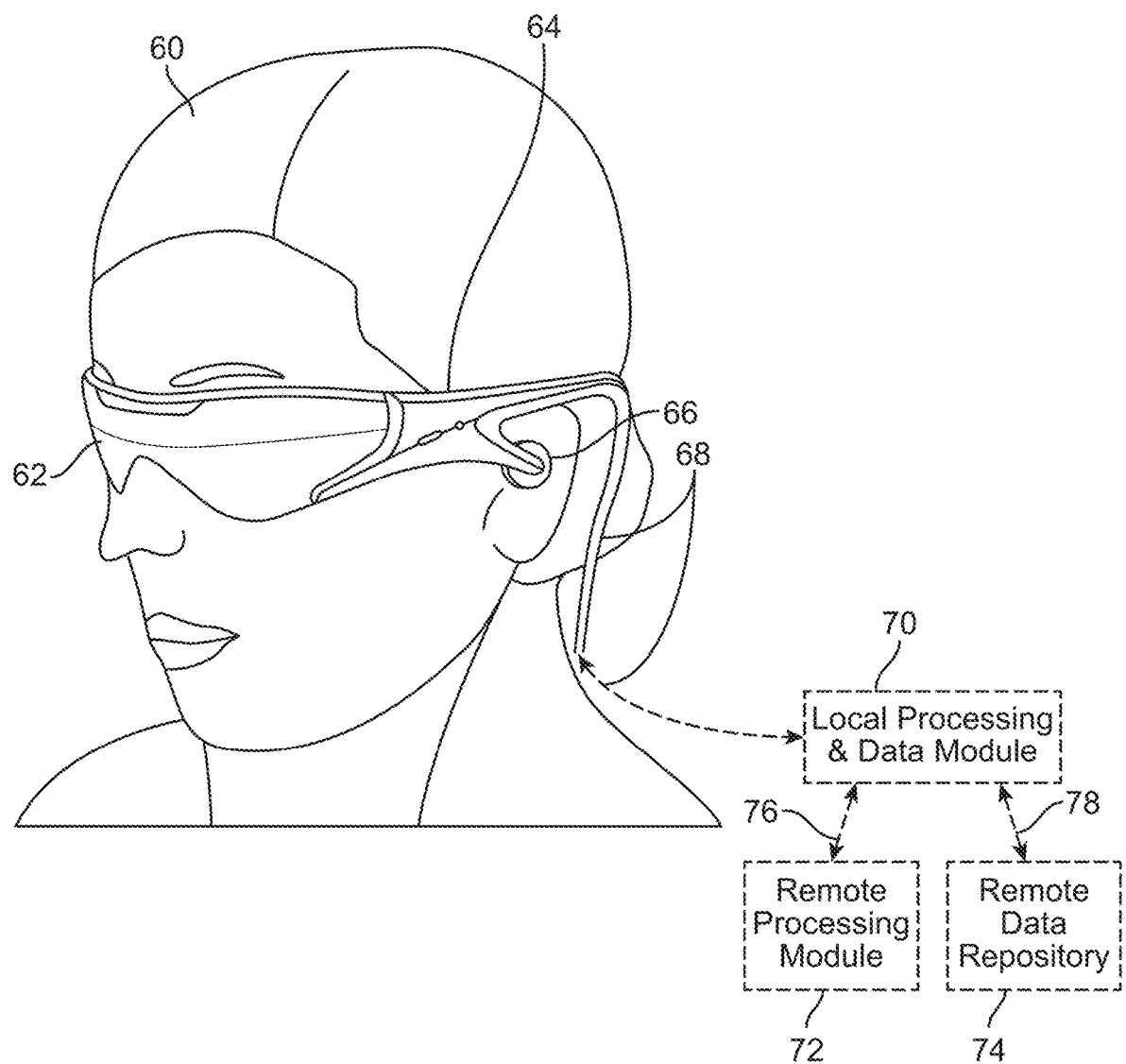
FIGS. 1A to 1D and 2A to 2D are schematic views of augmented reality/user identification systems according to various embodiments.
Figure 1B:
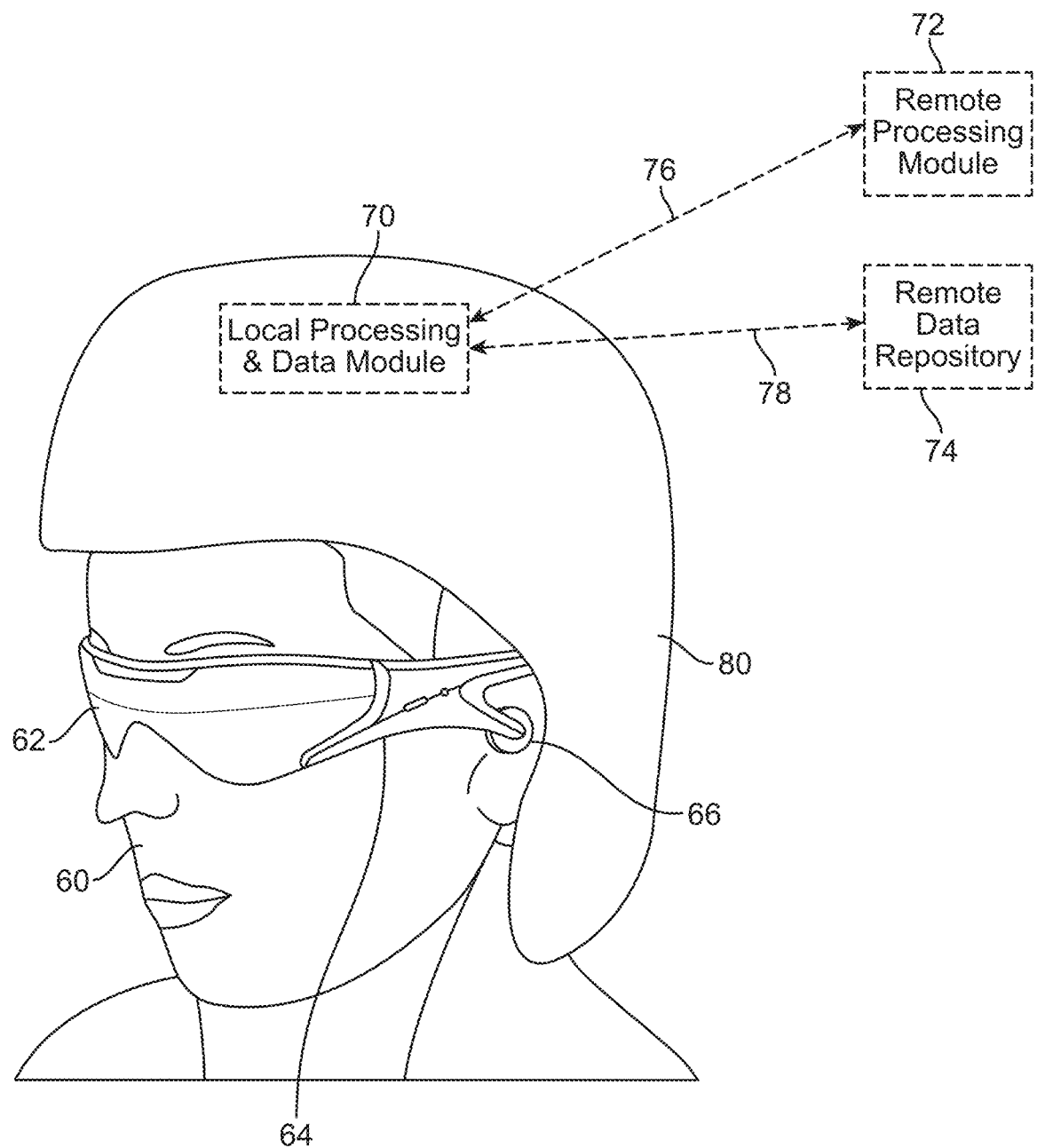

Various embodiments of the invention are directed to methods, systems, and articles of manufacture for implementing a biometric user identification system (e.g., for use with augmented reality systems) in a single embodiment or in multiple embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Augmented Reality and User Identification Systems

Various embodiments of augmented reality display systems have been discussed in co-owned U.S. Utility patent application Ser. No. 14/555,585 filed on Nov. 27, 2014 under attorney docket number ML-30011-US and entitled "VIRTUAL AND AUGMENTED REALITY SYSTEMS AND METHODS," and co-owned U.S. Prov. Patent Application Ser. No. 62/005,834 filed on May 30, 2014 under attorney docket number ML 30017.00 and entitled "METHODS AND SYSTEM FOR CREATING FOCAL PLANES IN VIRTUAL AND AUGMENTED REALITY," the contents of the aforementioned U.S. patent applications are hereby expressly and fully incorporated herein by reference as though set forth in full. The user recognition device may be implemented independently of AR systems, but many embodiments below are described in relation to AR systems for illustrative purposes only.

Disclosed are devices, methods and systems for recognizing users of various computer systems. In one embodiment, the computer system may be a head-mounted system configured to facilitate user interaction with various other computer systems (e.g., financial computer systems). In other embodiments, the computer system may be a stationary device (e.g., a merchant terminal or an ATM) configured to facilitate user financial transactions. Various embodiments will be described below with respect to user recognition in the context of user financial transactions utilizing an AR system (e.g., head-mounted), but it should be appreciated that the embodiments disclosed herein may be used independently of any existing and/or known AR or financial transaction systems.

For instance, when the user of an AR system attempts to complete a commercial transaction using the AR system (e.g., purchase an item from an online retailer using funds from an online checking account), the system must first establish the user's identity before proceeding with the commercial transaction. The input for this user identity determination can be images of the user generated by the AR system over time. As described by Daugman in U.S. Pat. No. 5,291,560, incorporated by reference above, an iris pattern can be used to identify the user. However, user identification is not limited to iris patterns, and may include other unique attributes or characteristics of users, as described in co-owned U.S. Provisional Application Ser. No. 62/161,588 filed on May 14, 2015 entitled "AUGMENTED REALITY SYSTEMS AND METHODS FOR TRACKING BIOMETRIC DATA TO CONDUCT BUSINESS TRANSACTIONS," under attorney docket number ML.30027.00, the contents of which are hereby expressly and fully incorporated herein by reference as though set forth in full.

The user identification devices and systems described herein utilize one or more back propagation neural networks to facilitate analysis of user attributes to determine the identity of a user/wearer. Machine learning methods can efficiently render identification decisions (e.g., Sam or not Sam) using back propagation neural networks. The neural networks described herein include additional layers to more accurately (i.e., closer to "the truth") and precisely (i.e., more repeatable) render identification decisions while minimizing computing/processing requirements (e.g., processor cycles and time).

Referring now to FIGS. 1A-1D, some general AR system component options are illustrated according to various embodiments. It should be appreciated that although the embodiments of FIGS. 1A-1D illustrate head-mounted displays, the same components may be incorporated in stationary computer systems as well, and FIGS. 1A-1D should not be seen as limiting.

As shown in FIG. 1A, a head-mounted device user 60 is depicted wearing a frame 64 structure coupled to a display system 62 positioned in front of the eyes of the user 60. The frame 64 may be permanently or temporarily coupled to one or more user identification specific sub systems depending on the required level of security. Some embodiments may be built specifically for user identification applications, and other embodiments may be general AR systems that are also capable of user identification. In either case, the following describes possible components of the user identification system or an AR system used for user identification.

Figure 1C:
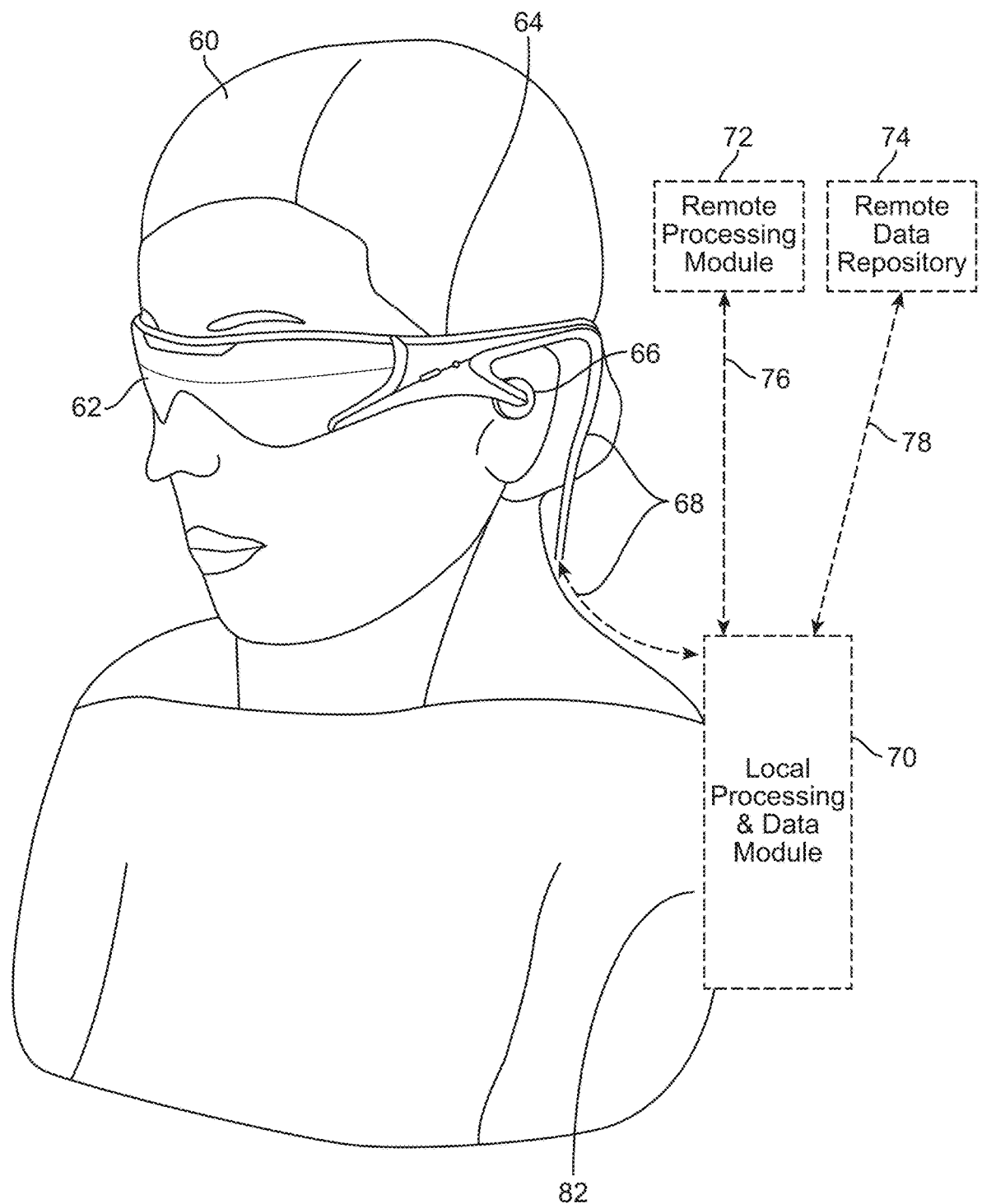
Figure 1D:
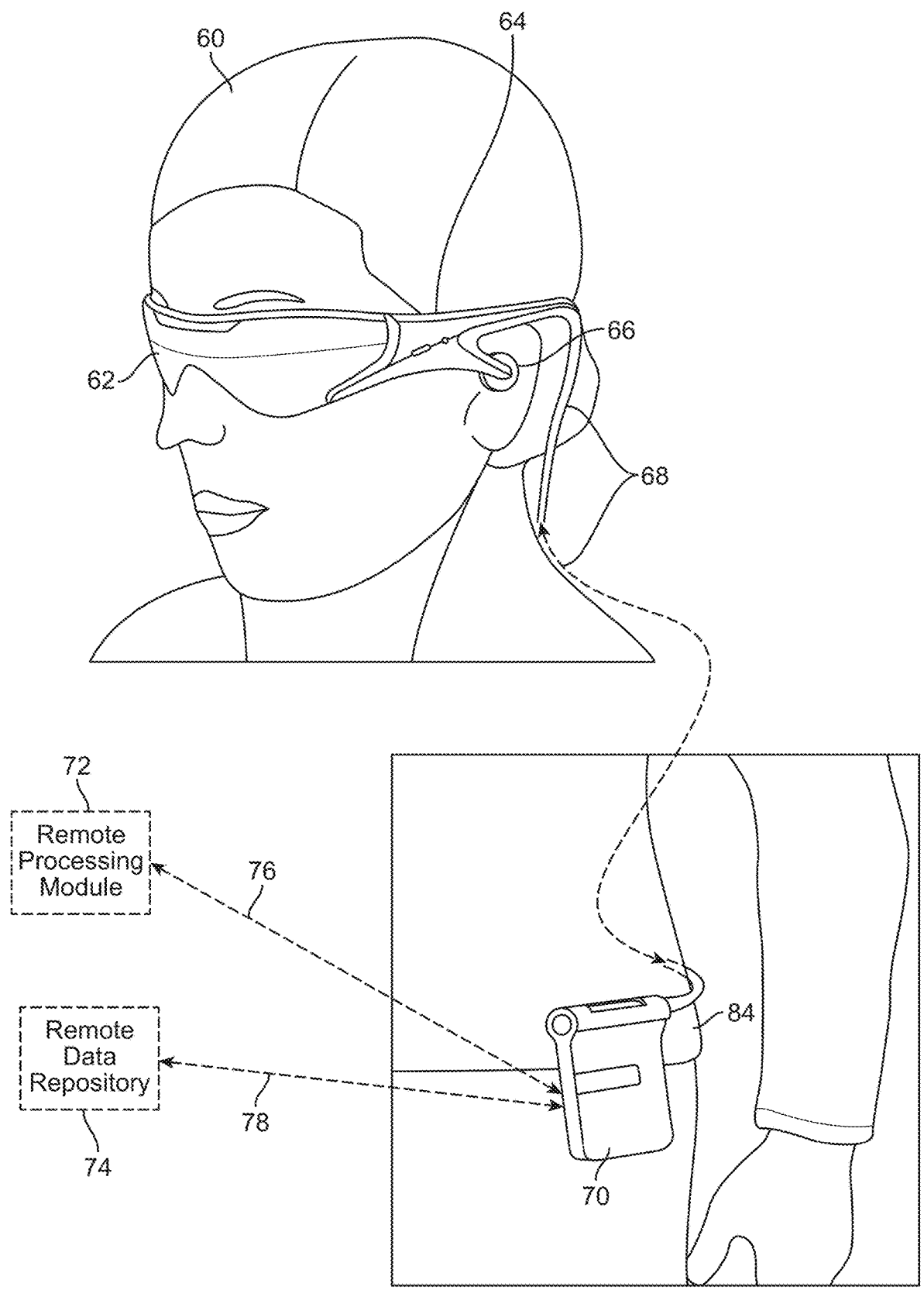

A speaker 66 may be coupled to the frame 64 in the depicted configuration and positioned adjacent the ear canal of the user 60. In an alternative embodiment, another speaker (not shown) is positioned adjacent the other ear canal of the user 60 to provide for stereo/shapeable sound control. In one or more embodiments, the user identification device may have a display 62 that is operatively coupled, such as by a wired lead or wireless connectivity, to a local processing and data module 70, which may be mounted in a variety of configurations, such as fixedly attached to the frame 64, fixedly attached to a helmet or hat 80 as shown in the embodiment depicted in FIG. 1B, embedded in headphones, removably attached to the torso 82 of the user 60 in a backpack-style configuration as shown in the embodiment of FIG. 1C, or removably attached to the hip 84 of the user 60 in a belt-coupling style configuration as shown in the embodiment of FIG. 1D.

The local processing and data module 70 may comprise a power-efficient processor or controller, as well as digital memory, such as flash memory, both of which may be utilized to assist in the processing, caching, and storage of data. The data may be captured from sensors which may be operatively coupled to the frame 64, such as image capture devices (such as cameras), microphones, inertial measurement units, accelerometers, compasses, GPS units, radio devices, and/or gyros. Alternatively or additionally, the data may be acquired and/or processed using the remote processing module 72 and/or remote data repository 74, possibly for passage to the display 62 after such processing or retrieval. The local processing and data module 70 may be operatively coupled 76, 78, such as via a wired or wireless communication links, to the remote processing module 72 and the remote data repository 74 such that these remote modules 72, 74 are operatively coupled to each other and available as resources to the local processing and data module 70.

In one embodiment, the remote processing module 72 may comprise one or more relatively powerful processors or controllers configured to analyze and process data and/or image information. In one embodiment, the remote data repository 74 may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

More pertinent to the current disclosures, user identification devices (or AR systems having user identification applications) similar to those described in FIGS. 1A-1D provide unique access to a user's eyes. Given that the user identification/AR device interacts crucially with the user's eye to allow the user to perceive 3-D virtual content, and in many embodiments, tracks various biometrics related to the user's eyes (e.g., iris patterns, eye vergence, eye motion, patterns of cones and rods, patterns of eye movements, etc.), the resultant tracked data may be advantageously used in user identification applications. Thus, this unprecedented access to the user's eyes naturally lends itself to various user identification applications.

In one or more embodiments, the augmented reality display system may be used as a user-worn user identification device or system. Such user identification devices and systems capture images of a user's eye and track a user's eye movements to obtain data for user identification. Traditionally, user identification devices require a user to remain stationary because the devices to which the user is temporarily attached are stationary. Typically, the use is confined to the user identification instrument or device (e.g., face on a face resting component of user identification device with head forward, and/or finger in a fingerprint reading device, etc.) until the device has completed the data acquisition. Thus, current user identification approaches have a number of limitations.

In addition to restricting user movement during the user identification data acquisition, the traditional approaches may result in image capture errors, leading to user identification errors. Further, existing image (e.g., iris or fingerprint) analysis algorithms can result in user identification errors. For instance, most existing image analysis algorithms are designed and/or calibrated to balance user identification accuracy and precision with computer system requirements. Therefore, when a third party shares a sufficient amount of user characteristics with a user, an existing image analysis algorithm may mistakenly identify the third party as the user.

In one or more embodiments, a head-worn AR system including a user identification device similar to the ones shown in FIGS. 1A-1D may be used to initially and continuously identify a user before providing access to secure features of the AR system (described below). In one or more embodiments, an AR display system similar to the ones described in co-owned U.S. application Ser. No. 14/555,585, incorporated by reference above, may be used as a head-worn, user identification device. It should be appreciated that while a number of the embodiments described below may be implemented in head-worn systems, other embodiments may be implemented in stationary devices. For illustrative purposes, the disclosure will mainly focus on head-worn user identification devices and particularly AR devices, but it should be appreciated that the same principles may be applied to non-head-worn and non-AR embodiments as well.

In one or more embodiments, the AR display device may be used as a user-worn user identification device. The user-worn user identification device is typically fitted for a particular user's head, and the optical components are aligned to the user's eyes. These configuration steps may be used in order to ensure that the user is provided with an optimum augmented reality experience without causing any physiological side-effects, such as headaches, nausea, discomfort, etc. Thus, in one or more embodiments, the user-worn user identification device is configured (both physically and digitally) for each individual user, and a set of programs may be calibrated specifically for the user. In other scenarios, a loose fitting AR device may be used comfortably by a variety of users. For example, in some embodiments, the user worn user identification device knows a distance between the user's eyes, a distance between the head worn display and the user's eyes, and a curvature of the user's forehead. All of these measurements may be used to provide a head-worn display system customized to fit a given user. In other embodiments, such measurements may not be necessary in order to perform the user identification functions.

Figure 2A:
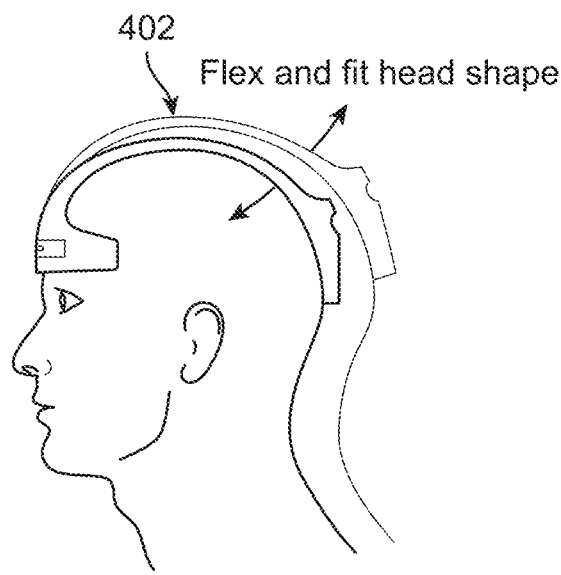
Figure 2B:
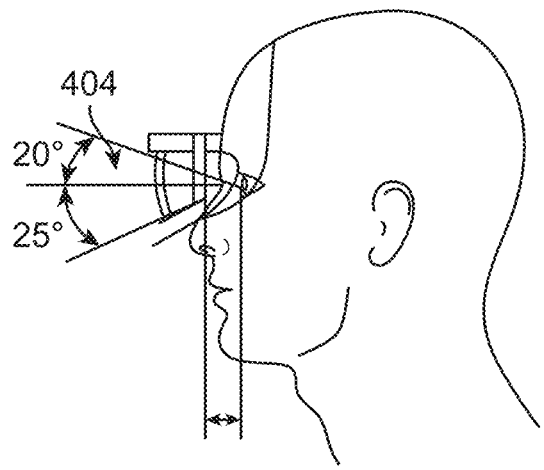
Figure 2C:
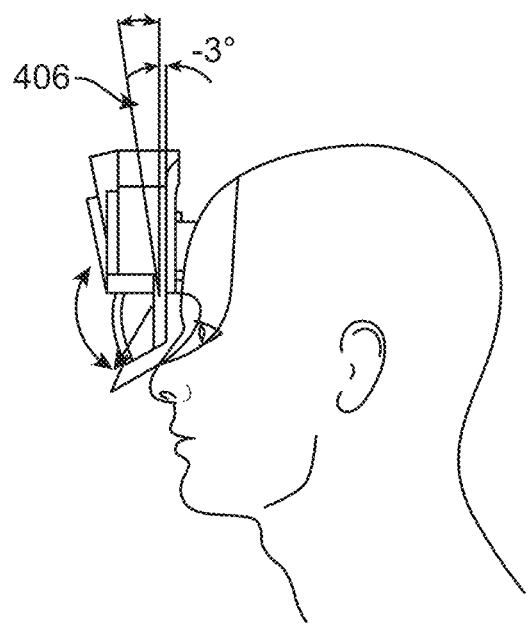
Figure 2D:
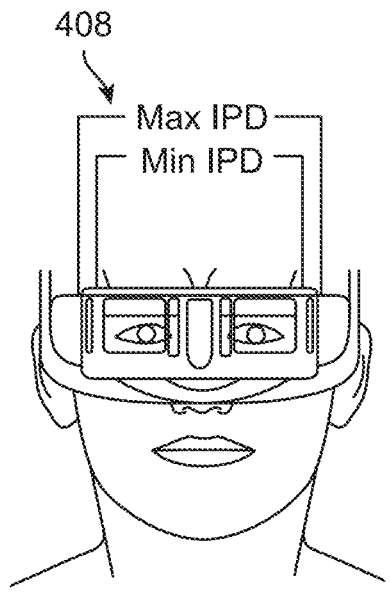

For example, referring to FIGS. 2A-2D, the user identification device may be customized for each user. The user's head shape 402 may be taken into account when fitting the head-mounted user-worn user identification system, in one or more embodiments, as shown in FIG. 2A. Similarly, the eye components 404 (e.g., optics, structure for the optics, etc.) may be rotated or adjusted for the user's comfort both horizontally and vertically, or rotated for the user's comfort, as shown in FIG. 2B. In one or more embodiments, as shown FIG. 2C, a rotation point of the head set with respect to the user's head may be adjusted based on the structure of the user's head. Similarly, the inter-pupillary distance (IPD) (i.e., the distance between the user's eyes) may be compensated for, as shown in FIG. 2D.

Advantageously, in the context of user-worn user identification devices, the customization of the head-worn devices for each user is advantageous because a customized system already has access to a set of measurements about the user's physical features (e.g., eye size, head size, distance between eyes, etc.), and other data that may be used in user identification.

In addition to the various measurements and calibrations performed on the user, the user-worn user identification device may be configured to track a set of biometric data about the user. For example, the system may track eye movements, eye movement patterns, blinking patterns, eye vergence, fatigue parameters, changes in eye color, changes in focal distance, and many other parameters, which may be used in providing an optical augmented reality experience to the user. In the case of AR devices used for user identification applications, it should be appreciated that some of the above-mentioned aspects may be part of generically-available AR devices, and other features (described herein) may be incorporated for particular user identification applications.

Figure 3:
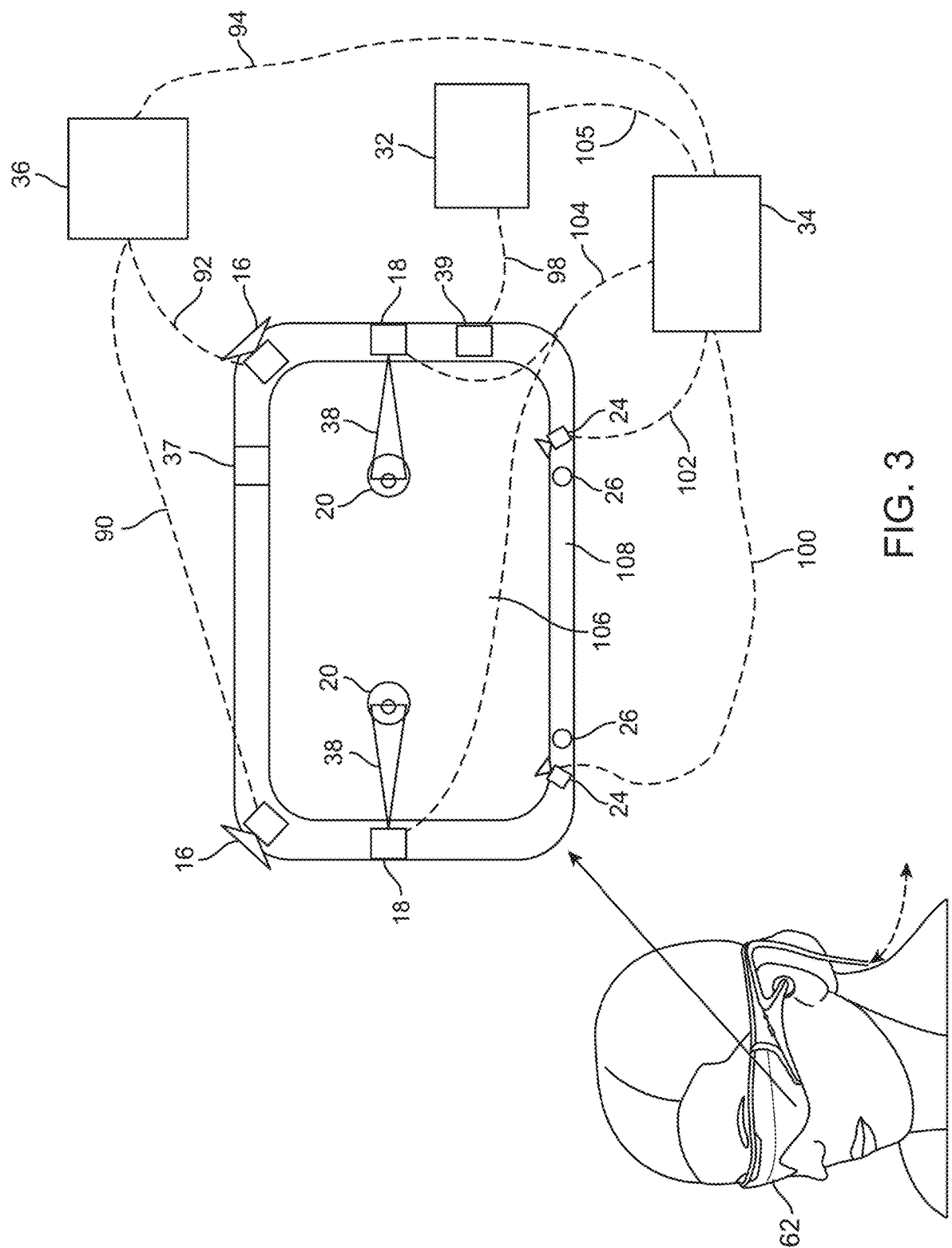
FIG. 3 is a detailed schematic view of an augmented reality/user identification system according to another embodiment.

Referring now to FIG. 3, the various components of an example user-worn user identification display device will be described. It should be appreciated that other embodiments may have additional components depending on the application (e.g., a particular user identification procedure) for which the system is used. Nevertheless, FIG. 3 provides a basic idea of the various components, and the types of biometric data that may be collected and stored through the user-worn user identification device or AR device. FIG. 3 shows a simplified version of the head-mounted user identification device 62 in the block diagram to the right for illustrative purposes.

Referring to FIG. 3, one embodiment of a suitable user display device 62 is shown, comprising a display lens 106 which may be mounted to a user's head or eyes by a housing or frame 108. The user display device 62 is an AR system that is configured to perform a variety of functions, including identify its wearer/user. The display lens 106 may comprise one or more transparent mirrors positioned by the housing 84 in front of the user's eyes 20 and configured to bounce projected light 38 into the eyes 20 and facilitate beam shaping, while also allowing for transmission of at least some light from the local environment. In the depicted embodiment, two wide-field-of-view machine vision cameras 16 are coupled to the housing 108 to image the environment around the user; in one embodiment these cameras 16 are dual capture visible light/infrared light cameras.

The depicted embodiment also comprises a pair of scanned-laser shaped-wavefront (i.e., for depth) light projector modules 18 with display mirrors and optics configured to project light 38 into the eyes 20 as shown. The depicted embodiment also comprises two miniature infrared cameras 24 paired with infrared light sources 26 (such as light emitting diodes or "LEDs"), which are configured to track the eyes 20 of the user to support rendering and user input. These infrared cameras 24 are also configured to continuously and dynamically capture images of the user's eyes, especially the iris thereof, which can be utilized in user identification.

The system 62 further features a sensor assembly 39, which may comprise X, Y, and Z axis accelerometer capability as well as a magnetic compass and X, Y, and Z axis gyro capability, preferably providing data at a relatively high frequency, such as 200 Hz. An exemplary sensor assembly 39 is an inertial measurement unit ("IMU"). The depicted system 62 also comprises a head pose processor 36 ("image pose processor"), such as an ASIC (application specific integrated circuit), FPGA (field programmable gate array), and/or ARM processor (advanced reduced-instruction-set machine), which may be configured to calculate real or near-real time user head pose from wide field of view image information output from the capture devices 16.

Also shown is another processor 32 ("sensor pose processor") configured to execute digital and/or analog processing to derive pose from the gyro, compass, and/or accelerometer data from the sensor assembly 39. The depicted embodiment also features a GPS (global positioning system) subsystem 37 to assist with pose and positioning. In addition, the GPS may further provide cloud-based information about the user's location. This information may be used for user identification purposes. For example, if the user identification algorithm can narrow the detected user characteristics to two potential user identities, a user's current and historical location data may be used to eliminate one of the potential user identities.

Finally, the depicted embodiment comprises a rendering engine 34 which may feature hardware running a software program configured to provide rendering information local to the user to facilitate operation of the scanners and imaging into the eyes of the user, for the user's view of the world. The rendering engine 34 is operatively coupled 94, 100, 102, 104, 105 (i.e., via wired or wireless connectivity) to the image pose processor 36, the eye tracking cameras 24, the projecting subsystem 18, and the sensor pose processor 32 such that rendered light is projected using a scanned laser arrangement 18 in a manner similar to a retinal scanning display. The wavefront of the projected light beam 38 may be bent or focused to coincide with a desired focal distance of the projected light.

The miniature infrared eye tracking cameras 24 may be utilized to track the eyes to support rendering and user input (e.g., where the user is looking, what depth he is focusing, etc.) As discussed below, eye verge may be utilized to estimate a depth of a user's focus. The GPS 37, and the gyros, compasses and accelerometers in the sensor assembly 39 may be utilized to provide coarse and/or fast pose estimates. The camera 16 images and sensor pose information, in conjunction with data from an associated cloud computing resource, may be utilized to map the local world and share user views with a virtual or augmented reality community and/or user identification system.

While much of the hardware in the display system 62 featured in FIG. 3 is depicted directly coupled to the housing 108 which is adjacent the display 106 and eyes 20 of the user, the hardware components depicted may be mounted to or housed within other components, such as a belt-mounted component, as shown, for example, in FIG. 1D.

In one embodiment, all of the components of the system 62 featured in FIG. 3 are directly coupled to the display housing 108 except for the image pose processor 36, sensor pose processor 32, and rendering engine 34, and communication between the latter three and the remaining components of the system 62 may be by wireless communication, such as ultra-wideband, or wired communication. The depicted housing 108 preferably is head-mounted and wearable by the user. It may also feature speakers, such as those which may be inserted into the ears of a user and utilized to provide sound to the user.

Regarding the projection of light 38 into the eyes 20 of the user, in one embodiment the mini cameras 24 may be utilized to determine the point in space to which the centers of a user's eyes 20 are geometrically verged, which, in general, coincides with a position of focus, or "depth of focus," of the eyes 20. The focal distance of the projected images may take on a finite number of depths, or may be infinitely varying to facilitate projection of 3-D images for viewing by the user. The mini cameras 24 may be utilized for eye tracking, and software may be configured to pick up not only vergence geometry but also focus location cues to serve as user inputs.

Having described the general components of the AR/user identification system, additional components and/or features pertinent to user identification will be discussed below. It should be appreciated that some of the features described below will be common to user identification devices or most AR systems used for user identification purposes, while others will require additional components for user identification purposes.

User Identification

The subject augmented reality systems are ideally suited for assisting users with various types of important transactions, financial and otherwise, because they are very well suited to identifying, authenticating, localizing, and even determining a gaze of, a user.

Identifying a User from Eye-Tracking/Eye-Imaging

Figure 4:
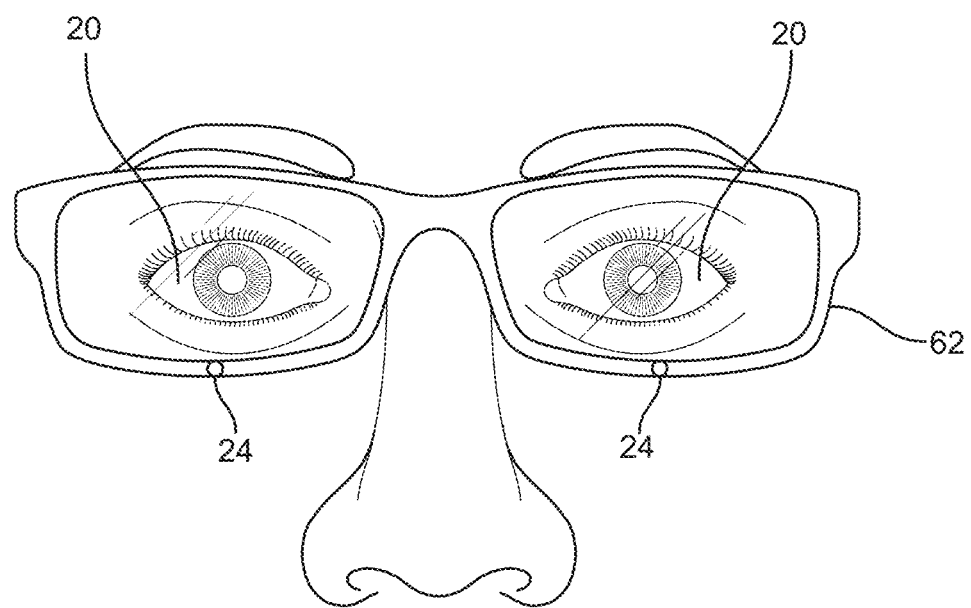
FIG. 4 is a schematic view of a user wearing an augmented reality/user identification system according to still another embodiment.

The subject AR system 62 generally needs to know where a user's eyes are gazing (or "looking") and where the user's eyes are focused. Thus in various embodiments, a head mounted display ("HMD") component features one or more cameras 24 that are oriented to capture image information pertinent to the user's eyes 20. In the embodiment depicted in FIG. 4, each eye 20 of the user may have a camera 24 focused on it, along with three or more LEDs (not shown) with known offset distances to the camera 24, to induce glints upon the surfaces of the eyes. In one embodiment, the LEDs are directly below the eyes 20.

Figure 5:
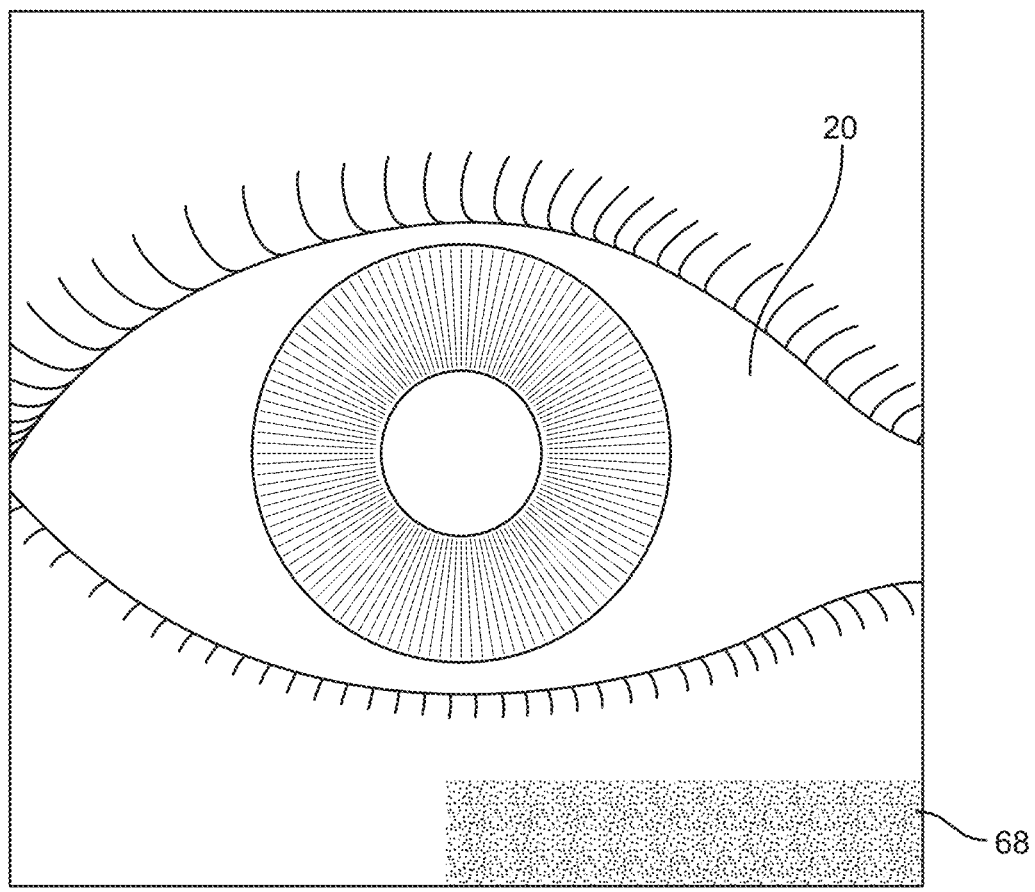
FIG. 5 is a schematic view of a user's eye, including an iris template according to one embodiment.

The presence of three or more LEDs with known offsets to each camera 24 allows determination of the distance from the camera 24 to each glint point in 3-D space by triangulation. Using at least 3 glint points and an approximately spherical model of the eye 20, the system 62 can deduce the curvature of the eye 20. With known 3-D offset and orientation to the eye 20, the system 62 can form exact (e.g., images) or abstract (e.g., gradients or other features) templates of the iris or retina for use to identify the user. In other embodiments, other characteristics of the eye 20, such as the pattern of veins in and over the eye 20, may also be used (e.g., along with the iris or retinal templates) to identify the user.

a. Iris image identification. In one embodiment, the pattern of muscle fibers in the iris of an eye 20 forms a stable unique pattern for each person, including freckles, furrows and rings. Various iris features may be more readily captured using infrared or near-infrared imaging compared to visible light imaging. The system 62 can transform the captured iris features into an identification code 68 in many different ways. The goal is to extract a sufficiently rich texture from the eye 20. With sufficient degrees of freedom in the collected data, the system 62 can theoretically identify a unique user among the seven billion living humans. Since the system 62 includes cameras 24 directed at the eyes 20 of the user from below or from the side, the system code 68 would not need to be rotationally invariant. FIG. 5 shows an example code 68 from an iris for reference.

For example, using the system camera 26 below the user eye 20 the capture images and several LEDs to provide 3-D depth information, the system 62 forms a template code 68, normalized for pupil diameter and its 3-D position. The system 62 can capture a series of template codes 68 over time from several different views as the user is registering with the device 62. This series of template codes 68 can be combined to form a single template code 68 for analysis.

b. Retinal image identification. In another embodiment, the HMD comprises a diffraction display driven by a laser scanner steered by a steerable fiber optic cable. This cable can also be utilized to visualize the interior of the eye and image the retina, which has a unique pattern of visual receptors (rods and cones) and blood vessels. These also form a pattern unique to each individual, and can be used to uniquely identify each person.

Figure 6:
FIG. 6 is an exemplary image of a user's retina according to another embodiment.

FIG. 6 illustrates an image of the retina, which may be transformed into a pattern by many conventional methods. For instance, the pattern of dark and light blood vessels is unique and can be transformed into a "dark-light" code by standard techniques such as apply gradient operators to the retinal image and counting high low transitions in a standardized grid centered at the center of the retina.

Thus the subject systems 62 may be utilized to identify the user with enhanced accuracy and precision by comparing user characteristics captured or detected by the system 62 with known baseline user characteristics for an authorized user of the system 62. These user characteristics may include iris and retinal images as described above.

The user characteristics may also include the curvature/size of the eye 20, which assists in identifying the user because eyes of different people have similar, but not exactly the same, curvature and/or size. Utilizing eye curvature and/or size also prevents spoofing of iris and retinal images with flat duplicates. In one embodiment described above, the curvature of the user's eye 20 can be calculated from imaged glints.

The user characteristics may further include temporal information. Temporal information can be collected while the user is subjected to stress (e.g., an announcement that their identity is being challenged). Temporal information includes the heart rate, whether the user's eyes are producing a water film, whether the eyes verge and focus together, breathing patterns, blink rate, pulse rate, etc.

Moreover, the user characteristics may include correlated information. For example, the system 62 can correlate images of the environment with expected eye movement patterns. The system 62 can also determine whether the user is seeing the same expected scene that correlates to the location as derived from GPS, Wi-Fi signals and/or maps of the environment. For example, if the user is supposedly at home (from GPS and Wi-Fi signals), the system should detect expected pose correct scenes inside of the home.

In addition, the user characteristics may include hyperspectral and/or skin/muscle conductance, which may be used to identify the user (by comparing with known baseline characteristics). Hyperspectral and/or skin/muscle conductance can also be used to determine that the user is a living person.

The user characteristics may also include eye movement patterns because the subject augmented reality systems configurations are designed to be worn persistently. Eye movement patterns can be compared with known baseline characteristics to identify (or help to identify) the user.

In other embodiments, the system can use a plurality of eye characteristics (e.g., iris and retinal patterns, eye shape, eye brow shape, eye lash pattern, eye size and curvature, etc.) to identify the user. By using a plurality of characteristics, such embodiments can identify users from lower resolution images when compared to systems that identify users using only a single eye characteristic (e.g., iris pattern).

The input to user the identification system (e.g., the deep biometric identification neural networks described herein) may be an image of an eye (or another portion of a user), or a plurality of images of the eye acquired over time (e.g., a video). In some embodiments, the network acquires more information from a plurality of images of the same eye compared to a single image. In some embodiments, some or all of the plurality of images are pre-processed before being analyzed to increase the effective resolution of the images using stabilized compositing of multiple images over time as is well known to those versed in the art.

The AR/user identification system can also be used to periodically identify the user and/or confirm that the system has not been removed from a user's head.

The above-described AR/user identification system provides an extremely secure form of user identification. In other words, the system may be utilized to determine who the user is with relatively high degrees of accuracy and precision. Since the system can be utilized to know who the user is with an unusually high degree of certainty, and on a persistent basis (using periodic monitoring), it can be utilized to enable various secure financial transactions without the need for separate logins.

Various computing paradigms can be utilized to compare captured or detected user characteristics with known baseline user characteristics for an authorized user to efficiently identify a user with accuracy and precision while minimizing computing/processing requirements.

Neural Networks

Figure 7:
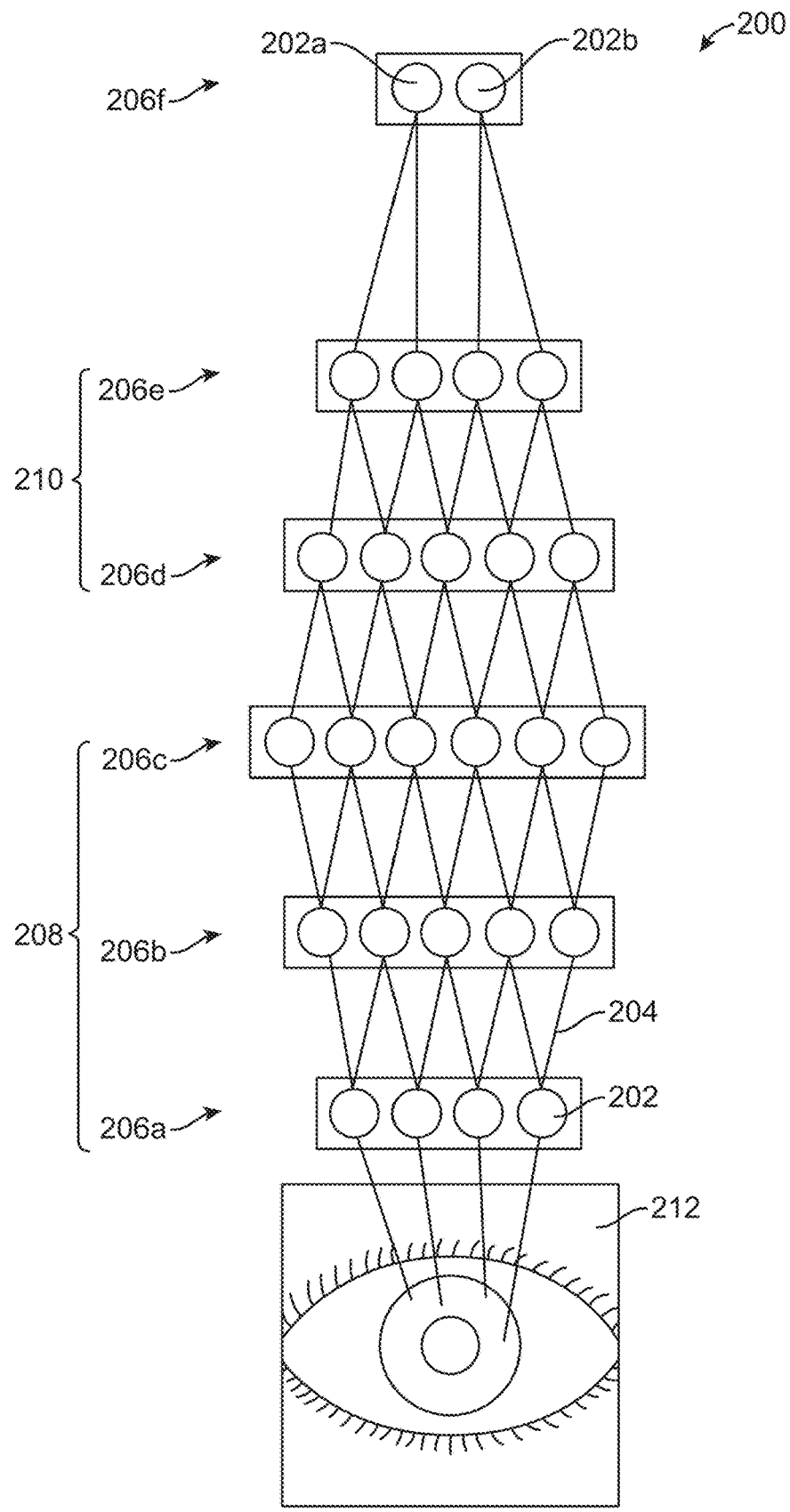
FIGS. 7 and 8 are diagrams depicting neural networks according to two embodiments.

FIG. 7 illustrates a back propagation neural network 200 according to one embodiment. The network 200 includes a plurality of nodes 202 connected by a plurality of connectors 204 that represent the output of one node 202, which forms the input for another node 202. Because the network 200 is a back propagation neural network, the connectors 204 are bidirectional, in that each node 202 can provide input to the nodes 202 in the layers on top of and below that node 202.

The network 200 includes six layers starting with first layer 206a and passing through ("rising up to") sixth ("classifier") layer 206f. The network 200 is configured to derive a classification (e.g., Sam/not Sam) decision based on detected user characteristics. In some embodiments, the classification decision is a Boolean decision. The first layer 206a is configured to scan the pixels of the captured image 212 (e.g., the image of the user's eye and particularly the user's iris). The information from the first layer 206a is processed by the nodes 202 therein and passed onto the nodes 202 in the second layer 206b.

The nodes 202 in the second layer 206b process the information from the first layer 206a, including error checking. If the second layer 206b detects errors in the information from first layer 206a, the erroneous information is suppressed in the second layer 206b. If the second layer 206b confirms the information from the first layer 206a, the confirmed information is elevated/strengthened (e.g., weighted more heavily for the next layer). This error suppressing/information elevating process is repeated between the second and third layers 206b, 206c. The first three layers 206a, 206b, 206c form an image processing subnetwork 208, which is configured to recognize/identify basic shapes found in the world (e.g., a triangle, an edge, a flat surface, etc.) In some embodiments, the image processing subnetwork 208 is fixed code that can be burned onto an application-specific integrated circuit ("ASIC").

The network 200 also includes fourth and fifth layers 206d, 206e, which are configured to receive information from the first three layers 206a, 206b, 206c and from each other. The fourth and fifth layers 206d, 206e form a generalist subnetwork 210, which is configured to identify objects in the world (e.g., a flower, a face, an apple, etc.) The error suppressing/information elevating process described above with respect to the image processing subnetwork 208 is repeated within the generalist subnetwork 210 and between the image processing and generalist subnetworks 208, 210.

The image processing and generalist subnetworks 208, 210 together form a nonlinear, logistic regression network with error suppression/learning elevation and back propagation that is configured to scan pixels of captured user images 212 and output at the classifier layer 206f a classification decision. The classifier layer 206f includes two nodes: (1) a positive/identified node 202a (e.g., Sam); and (2) a negative/unidentified node 202b (e.g., not Sam).

Figure 8:
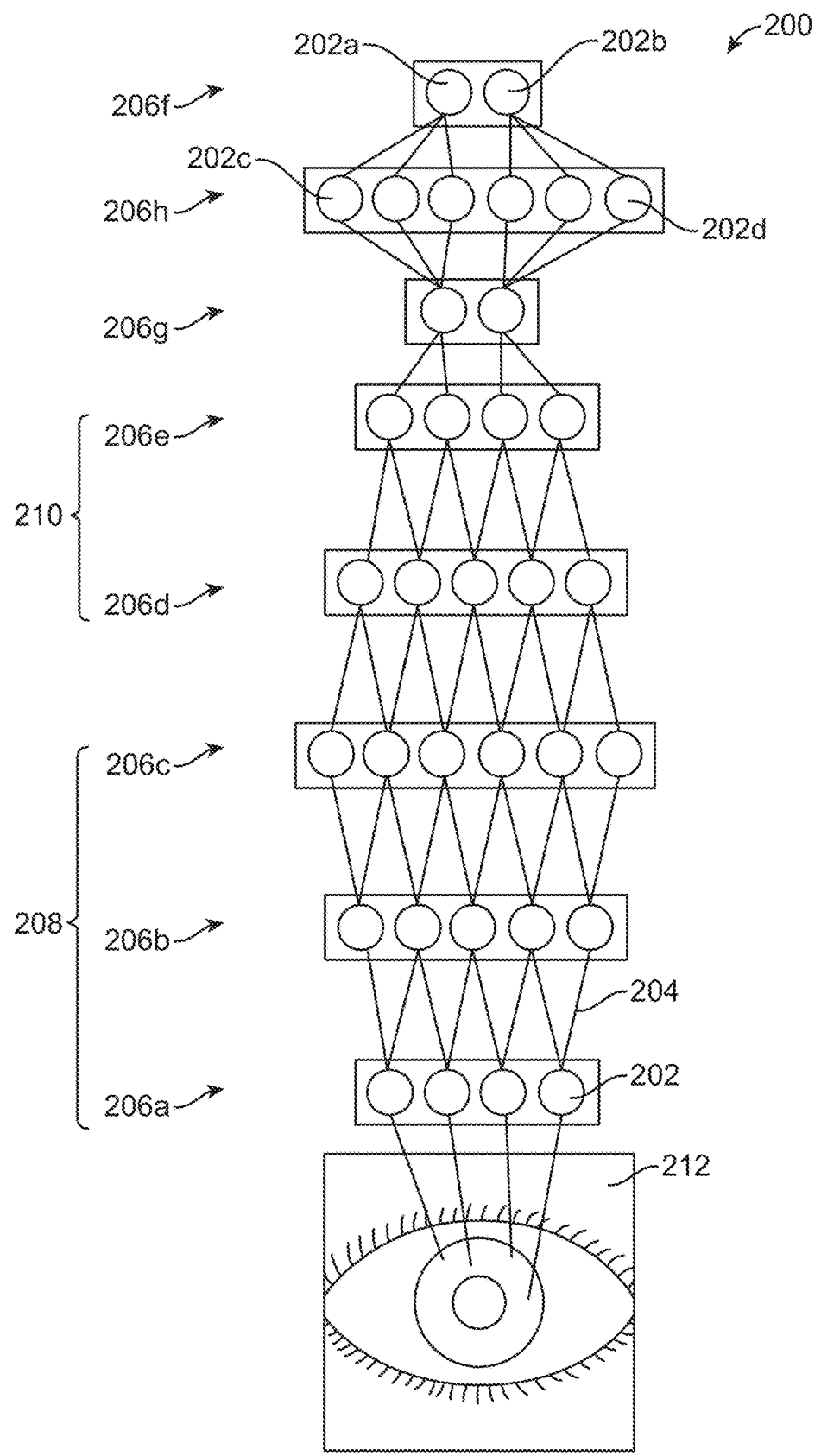

FIG. 8 depicts a neural network 200 according to another embodiment. The neural network 200 depicted in FIG. 8 is similar to the one depicted in FIG. 7, except that two additional layers are added between the generalist subnetwork 210 and the classifier layer 206f. In the network 200 depicted in FIG. 8, the information from the fifth layer 206e is passed onto a sixth ("tuning") layer 206g. The tuning layer 206g is configured to modify the image 212 data to take into account the variance caused by the user's distinctive eye movements. The tuning layer 206g tracks the user's eye movement over time and modifies the image 212 data to remove artifacts caused by those movements.

FIG. 8 also depicts a seventh ("specialist") layer 206h disposed between the tuning layer 206g and the classifier layer 206f. The specialist layer 206h may be a small back propagation specialist network comprising several layers. The specialist layer 206h is configured to compare the user's image 212 data against data derived from other similar images from a database of images (for instance, located on a cloud). The specialist layer 206h is further configured to identify all known images that the image recognition and generalist networks 208, 210, and the tuning layer 206g may confuse with the image 212 data from the user. In the case of iris recognition for example, there may be 20,000 irises out of the 7 billion people in the world that may be confused with the iris of any particular user.

The specialist layer 206h includes a node 202 for each potentially confusing image that is configured to distinguish the user image 212 data from the respective potentially confusing image. For instance, the specialist layer 206h may include a node 202c configured to distinguish Sam's iris from Tom's iris, and a node 202d configured to distinguish Sam's iris from Anne's iris. The specialist layer 206h may utilize other characteristics, such as eyebrow shape and eye shape, to distinguish the user from the potentially confusing other images. Each node 202 in the specialist layer 206h may include only around 10 extra operations due to the highly specialized nature of the function performed by each node 202. The output from the specialist layer or network 206h is passed on to the classifier layer 206h.

Figure 9:
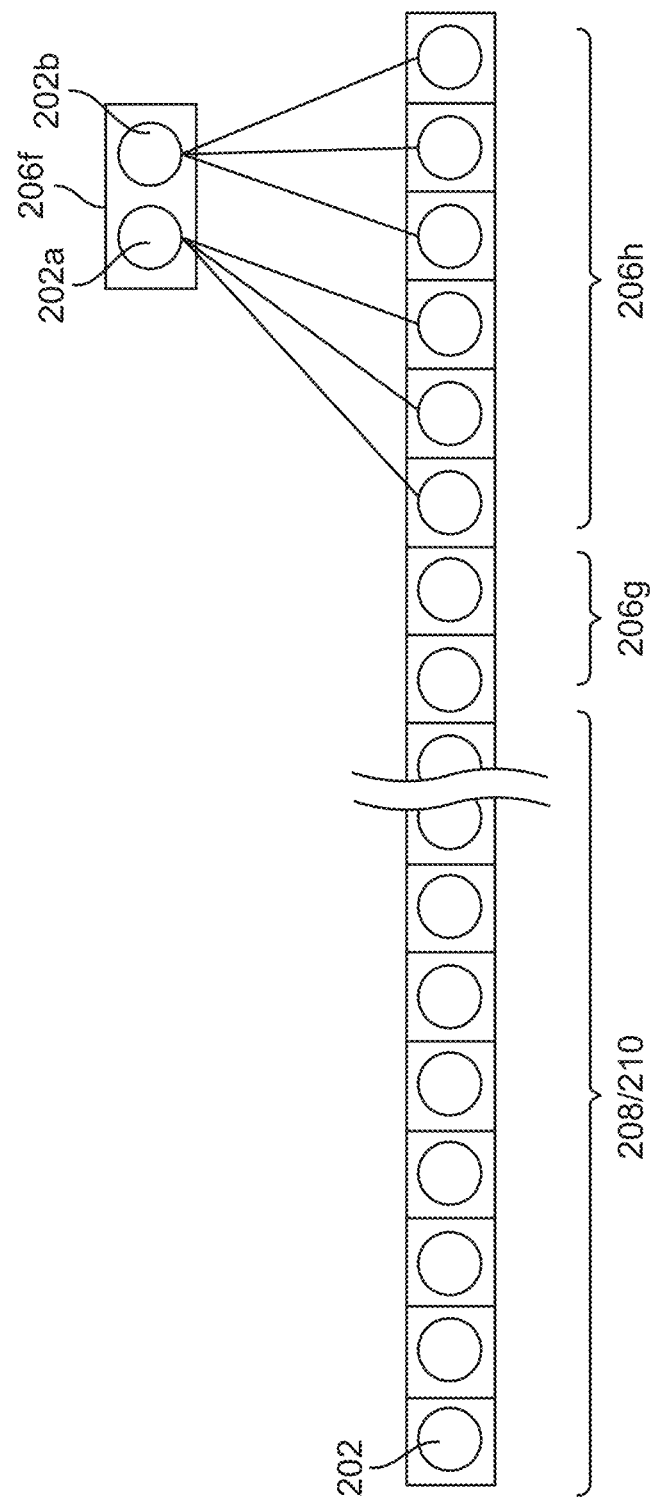
FIG. 9 is a diagram depicting a feature vector according to anther embodiment.

FIG. 9 depicts a single feature vector, which may be thousands of nodes long. In some embodiments, every node 202 in a neural network 200, for instance those depicted in FIGS. 7 and 8, may report to a node 202 in the feature vector.

While the networks 200 illustrated in FIGS. 7, 8 and 9 depict information traveling only between adjacent layers 206, most networks 200 include communication between all layers (these communications have been omitted from FIGS. 7, 8 and 9 for clarity). The networks 200 depicted in FIGS. 7, 8 and 9 form deep belief or convolutional neural networks with nodes 202 having deep connectivity to different layers 206. Using back propagation, weaker nodes are set to a zero value and learned connectivity patterns are passed up in the network 200. While the networks 200 illustrated in FIGS. 7, 8 and 9 have specific numbers of layers 206 and nodes 202, networks 200 according to other embodiments includes different (fewer or more) numbers of layers 206 and nodes 202.

Figure 10:
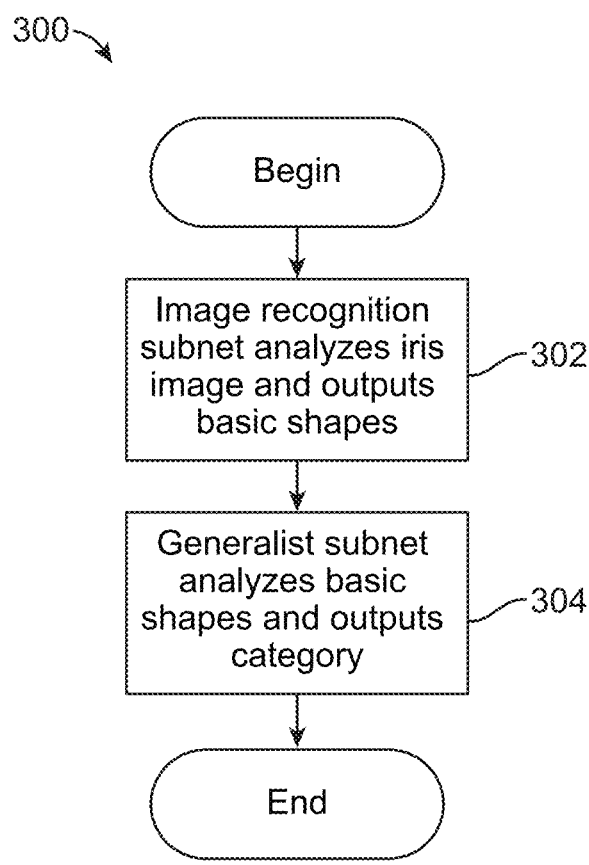
FIGS. 10 and 11 are flow charts depicting methods for identifying a user according to two embodiments.

Having described several embodiments of neural networks 200, a method 300 of making a classification decision (Sam/not Sam) using iris image information and the above-described neural networks 200 will now be discussed. As shown in FIG. 10, the classification method 300 begins at step 302 with the image recognition subnetwork 208 analyzing the user's iris image 212 data to determine the basic shapes are in that image 212 data. At step 304, the generalist subnetwork 210 analyzes the shape data from the image recognition subnetwork 208 to determine a category for the iris image 212 data. In some embodiments, the "category" can be "Sam" or "not Sam." In such embodiments, this categorization may sufficiently identify the user.

Figure 11:
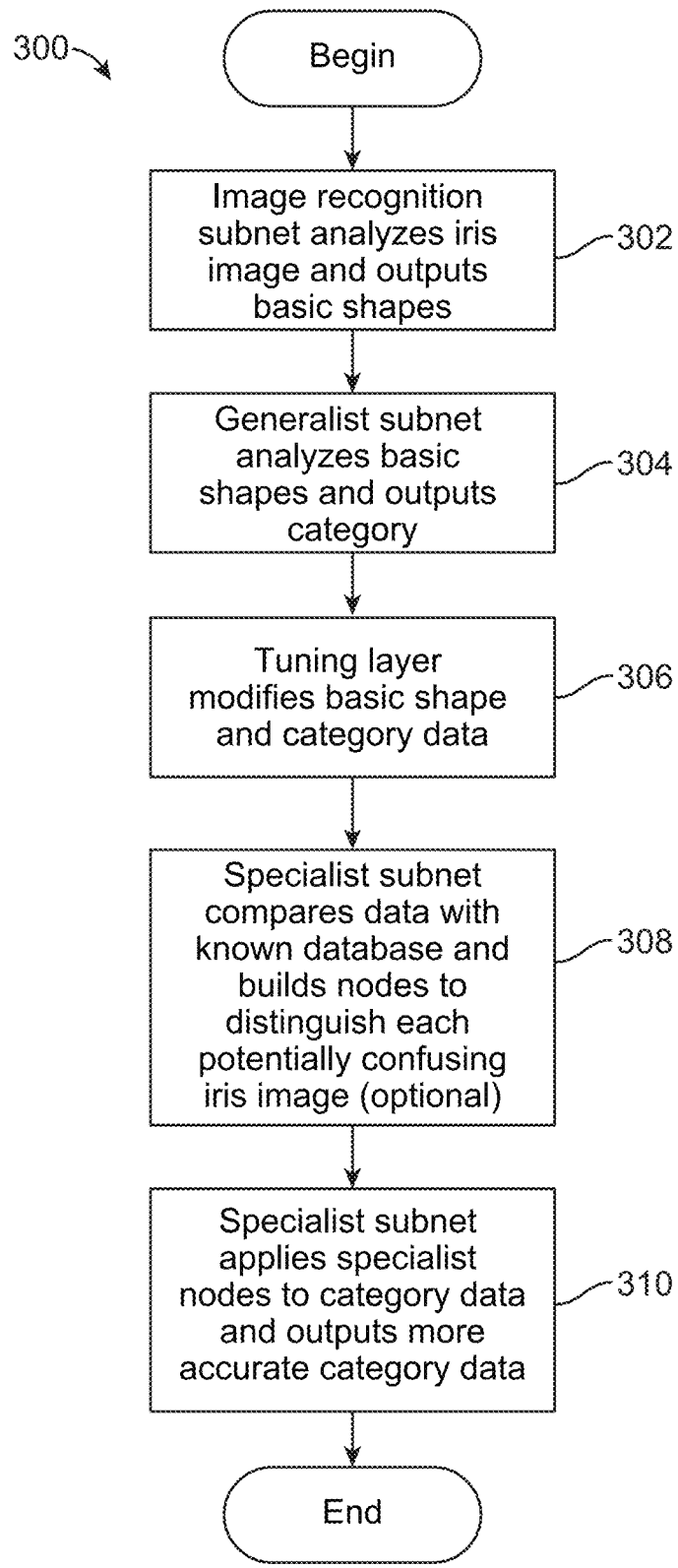

In other embodiments, an example of which is depicted in FIG. 11, the "category" can be a plurality of potential user identities including "Sam." Steps 302 and 304 in FIG. 11 are identical to those in FIG. 10. At step 306, the tuning layer 206g modifies the image shape and category data to remove artifacts caused by user's eye movements. Processing the data with the tuning layer 206g renders the data resilient to imperfect images 212 of a user's eye, for instance distortions caused by extreme angles. At step 308, the specialist layer/subnetwork 206h optionally builds itself by adding nodes 202 configured to distinguish the user's iris from every known potentially confusing iris in one or more databases, with a unique node for each unique potentially confusing iris. In some embodiments, step 308 may be performed when the AR/user identification system is first calibrated for its authorized user and after the user's identity is established using other (e.g., more traditional) methods. At step 310, the specialist layer/subnetwork 206h runs the "category" data from the generalist subnetwork 210 and the tuning layer 206g through each node 202 in the specialist layer/subnetwork 206h to reduce the confusion in the "category" until only "Sam" or "not Sam" remain.

The above-described neural networks 200 and user identification methods 300 provide more accurate and precise user identification from user characteristics while minimizing computing/processing requirements.

Secure Financial Transactions

As discussed above, passwords or sign up/login/authentication codes may be eliminated from individual secure transactions using the AR/user identification systems and methods described above. The subject system can pre-identify/pre-authenticate a user with a very high degree of certainty. Further, the system can maintain the identification of the user over time using periodic monitoring. Therefore, the identified user can have instant access to any site after a notice (that can be displayed as an overlaid user interface item to the user) about the terms of that site. In one embodiment the system may create a set of standard terms predetermined by the user, so that the user instantly knows the conditions on that site. If a site does not adhere to this set of conditions (e.g., the standard terms), then the subject system may not automatically allow access or transactions therein.

For example, the above-described AR/user identification systems can be used to facilitate "micro-transactions." Micro-transactions which generate very small debits and credits to the user's financial account, typically on the order of a few cents or less than a cent. On a given site, the subject system may be configured to see that the user not only viewed or used some content but for how long (a quick browse might be free, but over a certain amount would be a charge). In various embodiments, a news article may cost ⅓ of a cent; a book may be charged at a penny a page; music at 10 cents a listen, and so on. In another embodiment, an advertiser may pay a user half a cent for selecting a banner ad or taking a survey. The system may be configured to apportion a small percentage of the transaction fee to the service provider.

In one embodiment, the system may be utilized to create a specific micro-transaction account, controllable by the user, in which funds related to micro-transactions are aggregated and distributed in predetermined meaningful amounts to/from the user's more traditional financial account (e.g., an online banking account). The micro-transaction account may be cleared or funded at regular intervals (e.g., quarterly) or in response to certain triggers (e.g., when the user exceeds several dollars spent at a particular website).

Since the subject system and functionality may be provided by a company focused on augmented reality, and since the user's ID is very certainly and securely known, the user may be provided with instant access to their accounts, 3-D view of amounts, spending, rate of spending and graphical and/or geographical map of that spending. Such users may be allowed to instantly adjust spending access, including turning spending (e.g., micro-transactions) off and on.

In another embodiment, parents may have similar access to their children's accounts. Parents can set policies to allow no more than an amount of spending, or a certain percentage for a certain category and the like.

For macro-spending (e.g., amounts in dollars, not pennies or fraction of pennies), various embodiments may be facilitated with the subject system configurations.

The user may use the system to order perishable goods for delivery to their tracked location or to a user selected map location. The system can also notify the user when deliveries arrive (e.g., by displaying video of a delivery being made in the AR system). With AR telepresence, a user can be physically located in an office away from their house, but admit a delivery person into their house, appear to the delivery person by avatar telepresence, watch the delivery person as they deliver the product, then make sure the delivery person leaves, and lock the door to their house by avatar telepresence.

Optionally, the system may store user product preferences and alert the user to sales or other promotions related to the user's preferred products. For these macro-spending embodiments, the user can see their account summary, all the statistics of their account and buying patterns, thereby facilitating comparison shopping before placing their order.

Since the system may be utilized to track the eye, it can also enable "one glance" shopping. For instance, a user may look at an object (say a robe in a hotel) and say, "I want that, when my account goes back over $3,000." The system would execute the purchase when specific conditions (e.g., account balance greater than $3,000) are achieved.

The system/service provide can alternatives to established currency systems, similar to BITCOIN or equivalent alternative currency system, indexed to the very reliable identification of each person using the subject technology. Accurate and precise identification of users reduces the opportunities for crime related to alternative currency systems.

Secure Communications

In one embodiment, iris and/or retinal signature data may be used to secure communications. In such an embodiment, the subject system may be configured to allow text, image, and other content to be transmittable selectively to and displayable only on trusted secure hardware devices, which allow access only when the user can be authenticated based on one or more dynamically measured iris and/or retinal signatures. Since the AR system display device projects directly onto the user's retina, only the intended recipient (identified by iris and/or retinal signature) may be able to view the protected content; and further, because the viewing device actively monitors the users eye, the dynamically read iris and/or retinal signatures may be recorded as proof that the content was in fact presented to the user's eyes (e.g., as a form of digital receipt, possibly accompanied by a verification action such as executing a requested sequence of eye movements).

Spoof detection may rule out attempts to use previous recordings of retinal images, static or 2D retinal images, generated images, etc. based on models of natural variation expected. A unique fiducial/watermark may be generated and projected onto the retinas to generate a unique retinal signature for auditing.

The above-described financial and communication systems are provided as examples of various common systems that can benefit from more accurate and precise user identification. Accordingly, use of the AR/user identification systems described herein is not limited to the disclosed financial and communication systems, but rather applicable to any system that requires user identification.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method of identifying a user of a system, comprising:
analyzing image data;
generating shape data based on the image data;
analyzing the shape data;
generating general category data based on the shape data;
generating narrow category data by comparing the general category data with a characteristic;
generating a classification decision based on the narrow category data; and
generating a network of characteristics, wherein each respective characteristic of the network is associated with a potentially confusing mismatched individual in a database,
wherein the characteristic is selected from the group consisting of eyebrow shape and eye shape.

2. The method of claim 1, wherein the network of characteristics is generated when the system is first calibrated for the user.

3. The method of claim 1, further comprising identifying an error in a piece of data.

4. The method of claim 3, further comprising suppressing the piece of data in which the error is identified.

5. The method of claim 1, wherein analyzing the image data comprises scanning a plurality of pixel of the image data.

6. The method of claim 1, wherein the image data corresponds to an eye of the user.

7. A method of identifying a user of a system, comprising:
analyzing image data;
generating shape data based on the image data;
analyzing the shape data;
generating general category data based on the shape data;
generating narrow category data by comparing the general category data with a characteristic;
generating a classification decision based on the narrow category data;
generating a network of characteristics, wherein each respective characteristic of the network is associated with a potentially confusing mismatched individual in a database; and
tracking the user's eye movements over time.

8. The method of claim 7, further comprising modifying the general category data based on the eye movements of the user.

9. The method of claim 7, further comprising modifying the general category data to conform to a variance resulting from the eye movements of the user.

10. A user identification system, comprising:
a processor configured to receive image data and run a neural network; and
a memory configured to store the image data and the neural network, the neural network comprising
an image recognition subnetwork configured to analyze image data and generate shape data based on the image data;
a generalist subnetwork configured to analyze the shape data and generate general category data based on the shape data;
a specialist layer configured to compare the general category data with a characteristic to generate narrow category data; and
a classifier layer including a plurality of nodes configured to represent a classification decision based on the narrow category data,
wherein the image recognition subnetwork is directly coupled to the generalist network,
wherein the generalist network is directly coupled to the specialist layer,
wherein the specialist layer is directly coupled to the classifier layer, and
wherein the specialist layer comprises a back propagation network including a plurality of layers.

11. The system of claim 10, wherein the neural network also includes error suppression and learning elevation.

12. The system of claim 10, further comprising an ASIC encoded with the image recognition subnetwork.

13. The system of claim 10, wherein the image recognition subnetwork, the generalist subnetwork, the specialist layer, and the classifier layer each comprise a plurality of nodes and a plurality of connectors, and
wherein each node of the plurality of nodes is operatively coupled to at least one other node of the plurality of nodes by a respective connector of the plurality of connectors.

14. The system of claim 13, wherein each connector of the plurality of connectors is bidirectional.

15. The system of claim 13, wherein the specialist layer comprises a plurality of nodes associated with a plurality of potentially confusing mismatched individuals in a database.

16. A user identification system, comprising:
a processor configured to receive image data and run a neural network; and
a memory configured to store the image data and the neural network, the neural network comprising
an image recognition subnetwork configured to analyze image data and generate shape data based on the image data;
a generalist subnetwork configured to analyze the shape data and generate general category data based on the shape data;
a specialist layer configured to compare the general category data with a characteristic to generate narrow category data;
a classifier layer including a plurality of nodes configured to represent a classification decision based on the narrow category data; and
a tuning layer to modify the general category data based on user eye movements,
wherein the image recognition subnetwork is directly coupled to the generalist network,
wherein the generalist network is directly coupled to the specialist layer,
wherein the specialist layer is directly coupled to the classifier layer, and
wherein the tuning layer is directly coupled to the generalist subnetwork and the specialist layer.

17. The system of claim 16, wherein the neural network also includes error suppression and learning elevation.

18. The system of claim 16, wherein the image recognition subnetwork, the generalist subnetwork, the specialist layer, and the classifier layer each comprise a plurality of nodes and a plurality of connectors, and
   wherein each node of the plurality of nodes is operatively coupled to at least one other node of the plurality of nodes by a respective connector of the plurality of connectors.

19. The system of claim 18, wherein each connector of the plurality of connectors is bidirectional, and
   wherein the specialist layer comprises a plurality of nodes associated with a plurality of potentially confusing mismatched individuals in a database.

* * * * *